United States Patent
Yoo et al.

(10) Patent No.: US 9,599,760 B2
(45) Date of Patent: Mar. 21, 2017

(54) COMPOSITION FOR OPTICAL FILM, AND FILMS AND DISPLAY DEVICE

(71) Applicant: SAMSUNG ELECTRONICS CO., LTD, Suwon-si, Gyeonggi-do (KR)

(72) Inventors: Joungeun Yoo, Seongnam-si (KR); Sang Ho Park, Anyang-si (KR); Tae-Rae Kim, Seoul (KR); Bok Soon Kwon, Seoul (KR); Ki Tae Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/806,082

(22) Filed: Jul. 22, 2015

(65) Prior Publication Data

US 2016/0187552 A1 Jun. 30, 2016

(30) Foreign Application Priority Data

Dec. 26, 2014 (KR) ........................ 10-2014-0190806

(51) Int. Cl.
| | | |
|---|---|---|
| *G02B 5/30* | (2006.01) | |
| *C09K 19/30* | (2006.01) | |
| *G02B 1/11* | (2015.01) | |
| *C09K 19/20* | (2006.01) | |

(52) U.S. Cl.
CPC ........ *G02B 5/3016* (2013.01); *C09K 19/2007* (2013.01); *C09K 19/3068* (2013.01); *G02B 1/11* (2013.01); *G02B 5/3083* (2013.01)

(58) Field of Classification Search
CPC .......... G02B 1/06; G02B 1/11; G02B 5/3016; G02B 5/32; G02F 1/133528; G02F 1/133541; G02F 1/133543; G02F 1/133634; C09K 19/2007; C09K 2019/2035; C09K 2019/2042; C09K 19/3068; C09K 2019/3083; H01L 51/5281
USPC ................ 359/489.07, 489.15, 601; 349/96, 349/117–119, 137; 252/299.63, 299.66, 252/299.67
See application file for complete search history.

(56) References Cited

U.S. PATENT DOCUMENTS

| | | | |
|---|---|---|---|
| 5,795,629 A | 8/1998 | Harada et al. | |
| 6,667,077 B1 * | 12/2003 | Oaku ................. | C09K 19/0403 252/299.01 |
| 6,917,399 B2 | 7/2005 | Pokorny et al. | |
| 7,264,345 B2 | 9/2007 | Linuma et al. | |
| 7,597,945 B2 | 10/2009 | Hirai et al. | |
| 7,648,646 B2 | 1/2010 | Harding et al. | |
| 7,862,745 B2 | 1/2011 | Tano et al. | |
| 7,981,320 B2 | 7/2011 | Irisawa et al. | |
| 8,094,269 B2 * | 1/2012 | Kishioka ........... | G02F 1/133555 349/114 |
| 2005/0266158 A1 * | 12/2005 | Pokorny ............. | G02B 5/3016 427/162 |
| 2006/0114392 A1 | 6/2006 | Tanaka et al. | |
| 2006/0222784 A1 | 10/2006 | Saigusa et al. | |
| 2007/0109673 A1 * | 5/2007 | Padiyath ........... | B32B 17/10018 359/839 |
| 2009/0033839 A1 | 2/2009 | Fukuda et al. | |
| 2011/0095229 A1 * | 4/2011 | Lee ........................ | C09K 19/12 252/299.61 |
| 2014/0049707 A1 * | 2/2014 | Su .......................... | C09K 19/54 349/15 |
| 2015/0029446 A1 * | 1/2015 | Hirai ...................... | C09K 19/56 349/96 |
| 2015/0060734 A1 * | 3/2015 | Su ........................ | C09K 19/542 252/299.65 |

FOREIGN PATENT DOCUMENTS

| | | | |
|---|---|---|---|
| CN | 103074073 A | 5/2013 | |
| JP | 7230001 A | 8/1995 | |
| JP | 8254704 A | 10/1996 | |
| JP | 2004359919 A | 12/2004 | |
| JP | 2006188662 A | 7/2006 | |
| JP | 2011100153 A | 5/2011 | |
| KR | 20050024210 A | 3/2005 | |
| KR | 20050078468 A | 8/2005 | |
| KR | 20050108351 A | 11/2005 | |
| KR | 20090013091 A | 2/2009 | |
| KR | 20090037309 A | 4/2009 | |
| KR | 20130054427 A | 5/2013 | |
| KR | 1313044 B1 | 9/2013 | |
| KR | 1400385 B1 | 5/2014 | |
| KR | 20140112227 A | 9/2014 | |
| WO | 2006131191 A1 | 12/2006 | |

* cited by examiner

*Primary Examiner* — Frank Font
(74) *Attorney, Agent, or Firm* — Cantor Colburn LLP

(57) ABSTRACT

A composition for an optical film, including a first liquid crystal compound represented by the following Chemical Formula 1 and a second liquid crystal compound represented by the following Chemical Formula 2, wherein a difference between a solubility parameter of the first liquid crystal compound and a solubility parameter of the second liquid crystal compound is about 2.50 to about 2.90

Chemical Formula 1

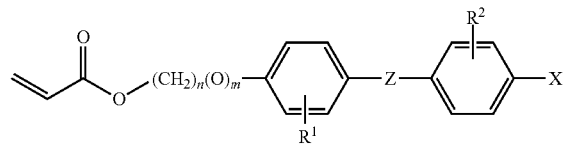

Chemical Formula 2

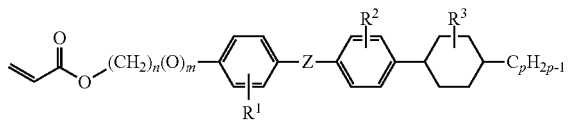

wherein in Chemical Formulae 1 and 2, X, $R^1$ to $R^3$, Z, n, m, and p are the same as described in the detailed description.

22 Claims, 17 Drawing Sheets

COMPOSITION FOR OPTICAL FILM, AND FILMS AND DISPLAY DEVICE

CROSS-REFERENCE TO RELATED APPLICATION

This application claims priority to and the benefit of Korean Patent Application No. 10-2014-0190806 filed in the Korean Intellectual Property Office on Dec. 26, 2014, the entire content of which is incorporated herein by reference.

BACKGROUND

1. Field

A composition for an optical film, films, and a display device are disclosed.

2. Description of the Related Art

Commonly used flat panel displays may be classified into a light-emitting display device emitting light by itself and a non-emissive display device requiring a separate light source. An optical film such as a retardation film is frequently employed for improving the image quality thereof.

In the case of the light emitting display device, for example, an organic light emitting display, the visibility and the contrast ratio may be deteriorated by reflection of external light caused by a metal such as an electrode. In order to reduce this, the linear polarized light is changed into circularly polarized light by using a polarizer and an optical film, to prevent the reflection of the external light by the organic light emitting display and leakage thereof.

A liquid crystal display (LCD) as a non-emissive display device uses an optical film and secures a wide viewing angle thereby. Thus, it may compensate retardation generated by liquid crystals.

An optical film obtained by stacking polymer films having different refractive indexes has been suggested. However, the stacked optical film has a disadvantage in that it alters the thinness of a display device. In addition, the stacked optical film requires a separate process of adhering the polymer films by using an adhesion layer and the like after respectively manufacturing the polymer films. Thus, the stacked optical film may also bring about display defects due to a stain by the adhesion, mixing of a foreign material, and the like as well as needing a complex process.

There remains a need in an optical film capable of simplifying a process of making the display device and improving its display characteristics without increasing the thickness of the device.

SUMMARY

An embodiment provides a composition for an optical film capable of simplifying a process and improving display characteristics of the device without increasing its thickness.

Another embodiment provides an optical film capable of simplifying a process and improving display characteristics of the device without increasing its thickness.

Yet another embodiment provides a compensation film including the optical film.

Still another embodiment provides an anti-reflective film including the optical film.

A further embodiment provides a display device including the optical film, the compensation film, or the anti-reflective film.

According to an embodiment, a composition for an optical film includes:

a first liquid crystal compound represented by Chemical Formula 1 and a second liquid crystal compound represented by Chemical Formula 2, wherein a difference between a solubility parameter of the first liquid crystal compound and a solubility parameter of the second liquid crystal compound is about 2.50 to about 2.90.

Chemical Formula 1

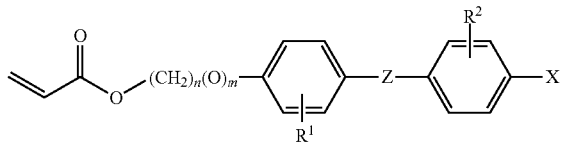

Chemical Formula 2

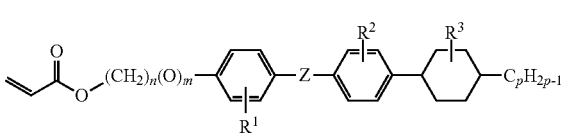

In Chemical Formula 1 or 2,

X is a hydrogen-bonding functional group, $R^1$ to $R^3$ are independently hydrogen, a substituted or unsubstituted C1 to C10 alkyl group, a substituted or unsubstituted C1 to C10 alkoxy group, a halogen atom, substituted or unsubstituted C1 to C10 a halogen-containing group, or a combination thereof, Z is a single bond, —C(=O)O—, —(O=C)O—, or —O(C=O)—, n is 4 to 8, m is 0 or 1, and p is 3 to 6.

The X of Chemical Formula 1 may include a cyano group, a substituted or unsubstituted C1 to C10 cyano-containing group, a hydroxy group, substituted or unsubstituted C1 to C10 hydroxy-containing group, a carboxyl group, a substituted or unsubstituted carboxyl-containing group, or a combination thereof.

The first liquid crystal compound may be represented by Chemical Formula 1a and the second liquid crystal compound may be represented by Chemical Formula 2a.

Chemical Formula 1a

Chemical Formula 2a

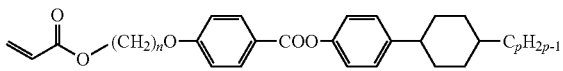

In Chemical Formula 1a or 2a,

X is a cyano group, a substituted or unsubstituted C1 to C10 cyano-containing group, a hydroxy group, substituted or unsubstituted C1 to C10 hydroxy-containing group, a carboxyl group, a substituted or unsubstituted C1-C10 carboxyl-containing group, or a combination thereof, n is 4 to 8, and p is 3 to 6.

The first liquid crystal compound may be represented by Chemical Formula 1 aa and the second liquid crystal compound may be represented by one of Chemical Formulae 2aa to 2ad.

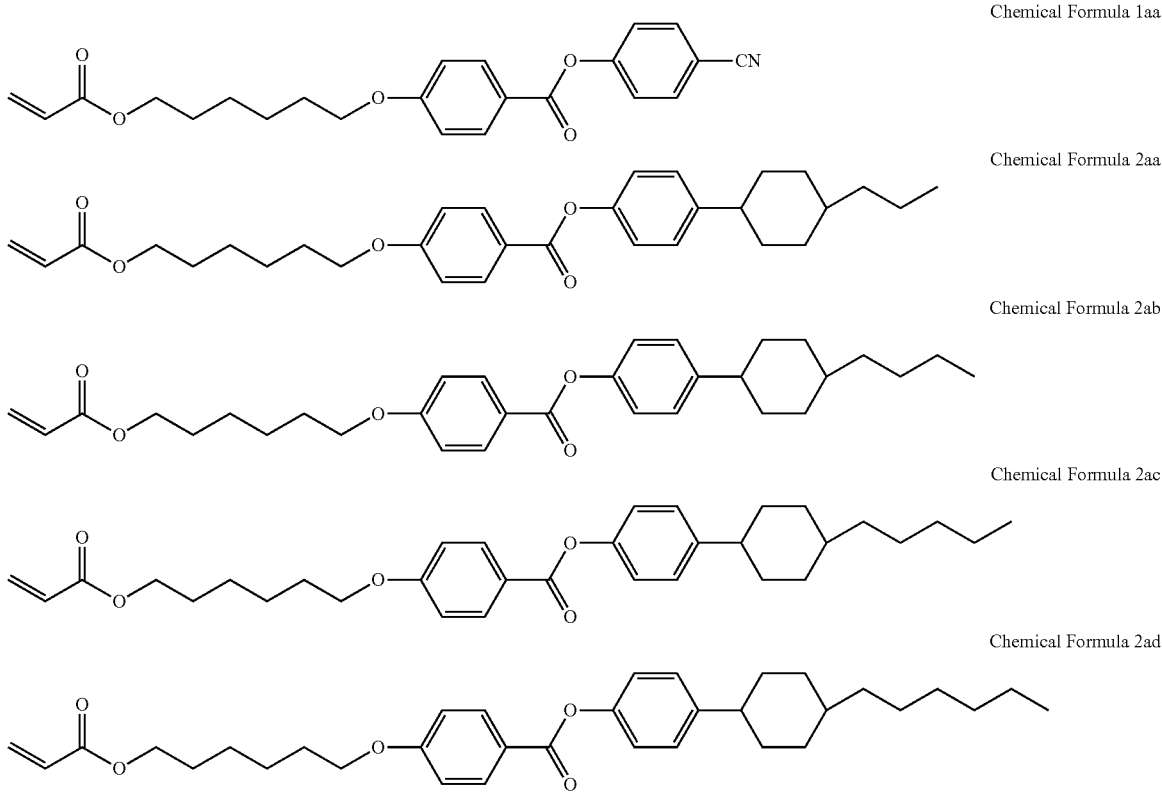

Chemical Formula 1aa

Chemical Formula 2aa

Chemical Formula 2ab

Chemical Formula 2ac

Chemical Formula 2ad

The composition may further include a solvent, and the composition may include about 5 to about 50 percent by weight of the first liquid crystal compound and the second liquid crystal compound based on the total weight of the composition, and the remaining amount of the solvent.

The first liquid crystal compound and the second liquid crystal compound may be included in a mole ratio of about 1:0.7 to about 1:2.

The composition may further include a photoinitiator.

The photoinitiator may be included in an amount of about 0.1 to about 2 percent by weight based on the total weight of the composition. According to another embodiment, an optical film includes:

a substrate and a liquid crystal layer positioned on the substrate, wherein the liquid crystal layer includes the first liquid crystal compound represented by Chemical Formula 1 and the second liquid crystal compound represented by Chemical Formula 2, and wherein a difference between a solubility parameter of the first liquid crystal compound and a solubility parameter of the second liquid crystal compound is about 2.50 to about 2.90.

The X of Chemical Formula 1 may be a cyano group, substituted or unsubstituted C1 to C10 a cyano-containing group, a hydroxy group, a substituted or unsubstituted C1 to C10 hydroxy-containing group, a carboxyl group, a substituted or unsubstituted C1 to C10 carboxyl-containing group, or a combination thereof.

The first liquid crystal compound may be represented by Chemical Formula 1a and the second liquid crystal compound may be represented by Chemical Formula 2a.

The first liquid crystal compound and the second liquid crystal compound may be aligned in a direction perpendicular to the length direction of the substrate.

The liquid crystal layer may have in-plane retardation $R_0$ of 0 nanometers$\leq R_0 \leq$1 nanometer for incident light of about 550 nanometers wavelength.

The liquid crystal layer may have thickness direction retardation $R_{th}$ of 50 nanometers$\leq R_{th} \leq$500 nanometers for incident light of about 550 nanometers wavelength.

The liquid crystal layer may have a refractive index satisfying Relationship Equation 1.

$$n_z > n_x = n_y \quad \text{Relationship Equation 1}$$

In Relationship Equation 1, $n_x$ is a refractive index of the liquid crystal layer at a slow axis, $n_y$ is a refractive index of the liquid crystal layer at a fast axis, and $n_z$ is a refractive index in a direction perpendicular to $n_x$ and $n_y$.

According to another embodiment, a compensation film includes the optical film and a retardation film positioned on at least one side of the optical film.

The retardation film may include a λ/4 retardation film, a λ/2 retardation film, or a combination thereof.

According to still another embodiment, an anti-reflective film includes:

the compensation film and a polarizer positioned on the compensation film.

According to a further embodiment, a display device includes a display panel, and the optical film, the compensation film, or the anti-reflective film.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
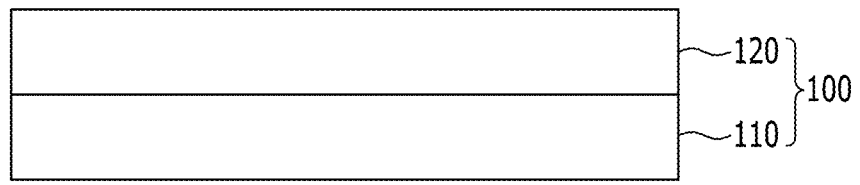
FIGS. 1 and 2 are cross-sectional views showing an optical film according to an embodiment.

Exemplary embodiments will hereinafter be described in detail, and may be easily performed by those who have common knowledge in the related art. However, this disclosure may be embodied in many different forms and should not be construed as limited to the exemplary embodiments set forth herein.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of", when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, when a definition is not otherwise provided, the term "substituted" refers to a group substituted with at least one substituent selected from a halogen atom (F, Br, Cl, or I), a hydroxy group, a C1 to C20 alkoxy group, a cyano group, an amino group, a C1 to C20 ester group, a C1 to C20 alkyl group, a C2 to C20 alkenyl group, a C2 to C20 alkynyl group, a C6 to C20 aryl group, a C3 to C20 heteroaryl group, and a combination thereof, instead of hydrogen of a compound.

As used herein, when a definition is not otherwise provided, the term "alkyl" indicates a group derived from a completely saturated, branched or unbranched (or a straight or linear) hydrocarbon and having a specified number of carbon atoms.

As used herein, when a definition is not otherwise provided, the term "alkoxy" represents "alkyl-O—", wherein the term "alkyl" has the same meaning as described above.

As used herein, when a definition is not otherwise provided, the term "halogen" includes fluorine, chlorine, bromine, and iodine.

As used herein, when a definition is not otherwise provided, the term "halogen-containing" indicates an organic group having at least one halogen atom.

As used herein, when a definition is not otherwise provided, the term "cyano-containing" indicates an organic group having at least one cyano group (—CN).

As used herein, when a definition is not otherwise provided, the term "hydroxy-containing" indicates an organic group having at least one hydroxy group (—OH).

As used herein, when a definition is not otherwise provided, the term "carboxyl-containing" indicates an organic group having at least one carboxyl group (—CO$_2$H).

Hereinafter, a composition for an optical film according to an embodiment is described.

A composition for an optical film according to an embodiment includes:

a liquid crystal mixture including a first liquid crystal compound represented by the following Chemical Formula 1 and a second liquid crystal compound represented by the following Chemical Formula 2, and optionally, a solvent.

Chemical Formula 1

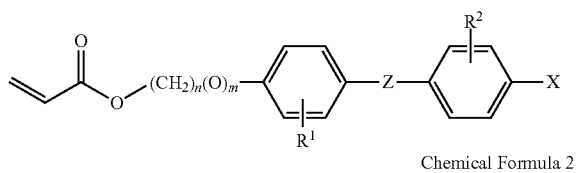

Chemical Formula 2

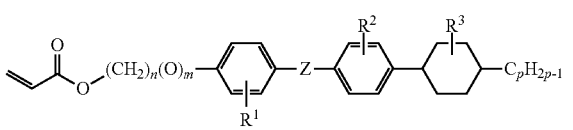

In Chemical Formula 1 or 2,

X is a hydrogen-bonding functional group,

R$^1$ to R$^3$ are independently hydrogen, a substituted or unsubstituted C1 to C10 alkyl group, a substituted or unsubstituted C1 to C10 alkoxy group, a halogen atom, a substituted or unsubstituted C1 to C10 halogen-containing group, or a combination thereof, Z is a single bond, —C(=O)O—, —(O=C)O—, or —O(=C)O—, n is 4 to 8, m is 0 or 1, p is 3 to 6.

The X of Chemical Formula 1 may include, for example, a cyano group, a substituted or unsubstituted C1 to C10 cyano-containing group, a hydroxy group, substituted or unsubstituted C1 to C10 hydroxy-containing group, a carboxyl group, a substituted or unsubstituted carboxyl-containing group, or a combination thereof, but is not limited thereto.

The first liquid crystal compound and the second liquid crystal compound may each be a reactive mesogenic liquid crystal, for example, a homeotropic liquid crystal, wherein the long axis of the liquid crystal is perpendicularly aligned to the length direction of a substrate.

A difference between a solubility parameter of the first liquid crystal compound and a solubility parameter of the second liquid crystal compound may be about 2.50 to about 2.90. The solubility parameter indicates a degree of interaction between two or more compounds. The smaller solubility parameter difference the compounds have, the larger interaction between them would be, while the larger solubility parameter difference the compounds have, the smaller interaction between them would be. The solubility parameter is related to a structure of the compound, and may be, for example, a Hildebrand solubility parameter.

When the first liquid crystal compound and the second liquid crystal compound have a solubility parameter difference within the range, the first liquid crystal compound and the second liquid crystal compound have high miscibility with each other due to the high degree of interaction between the molecules. Thus, agglomeration of the first liquid crystal compound and the second liquid crystal compound in a solvent may be reduced or prevented, and the first liquid crystal compound and the second liquid crystal compound may be aligned uniformly in a homeotropic direction. The solubility parameter difference between the first liquid crystal compound and the second liquid crystal compound may be about 2.58 to about 2.88.

The first liquid crystal compound and the second liquid crystal compound may include the same mesogenic moiety. The first liquid crystal compound includes a hydrogen-bonding functional group that is aligned to a substrate, and the second liquid crystal compound has the solubility parameter difference with the first liquid crystal compound.

The first liquid crystal compound may be, for example, represented by the following Chemical Formula 1a, and the second liquid crystal compound may be, for example, represented by the following Chemical Formula 2a.

Chemical Formula 1a

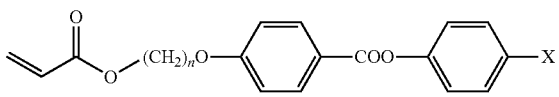

Chemical Formula 2a

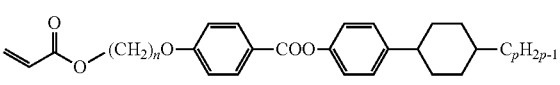

In Chemical Formula 1a or 2a,

X is a hydrogen-bonding functional group, for example a cyano group, a substituted or unsubstituted C1 to C10 cyano-containing group, a hydroxy group, substituted or unsubstituted C1 to C10 hydroxy-containing group, a carboxyl group, a substituted or unsubstituted C1-C10 carboxyl-containing group, or a combination thereof, n is 4 to 8, and p is 3 to 6.

The first liquid crystal compound may be, for example, represented by the following Chemical Formula 1aa, and the second liquid crystal compound may be, for example represented by one of the following Chemical Formulae 2aa to 2ad.

Chemical Formula 1aa

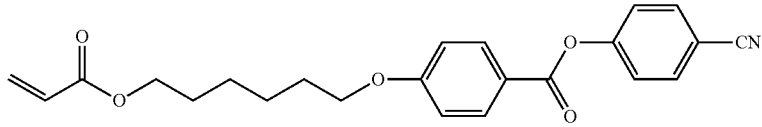

-continued

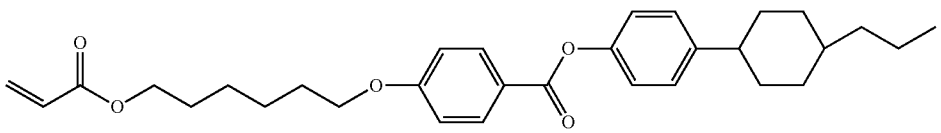

Chemical Formula 2aa

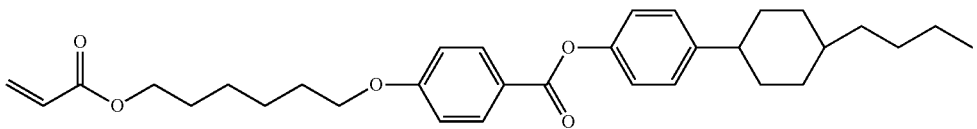

Chemical Formula 2ab

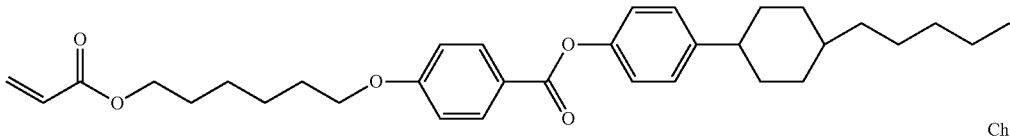

Chemical Formula 2ac

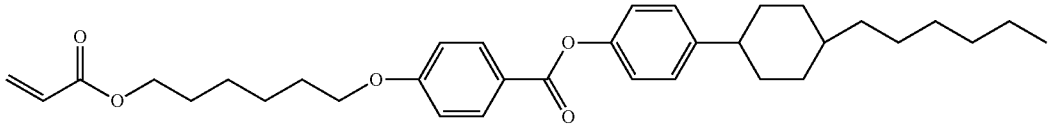

Chemical Formula 2ad

The first liquid crystal compound and the second liquid crystal compound may polymerize when exposed to heat or light, and the light may be, for example, ultraviolet rays having a wavelength ranging from about 250 nanometers (nm) to about 400 nm.

The first liquid crystal compound and the second liquid crystal compound may be included, for example, in a mole ratio of about 1:0.1 to about 1:3. Within this range, the first liquid crystal compound and the second liquid crystal compound may be included in a mole ratio of about 1:0.3 to about 1:2.7, about 1:0.5 to about 1:2.5, or about 1:0.7 to about 1:2. Within the above ranges, the first liquid crystal compound and the second liquid crystal compound may have better miscibility and alignment.

The liquid crystal mixture may further include one or more other kinds of liquid crystal compounds besides the first liquid crystal compound and the second liquid crystal compound.

The liquid crystal mixture may be included in an amount of about 5 to about 50 percent by weight (wt %) based on the total amount of the composition. Within this range, it may be included in an amount of about 5 to about 40 wt % or about 10 to about 35 wt %. Within the above ranges, the optical properties of the optical film may be effectively attained.

The composition may further include a reaction initiator. The reaction initiator may be, for example, a photoinitiator, for example a free radical photoinitiator and/or an ionic photoinitiator.

The reaction initiator may be included in an amount of about 0.01 to 5 wt % based on the total amount of the composition. Within this range, it may be included in an amount of about 0.1 to about 4 wt % or about 0.1 to about 2 wt %. Within the above ranges, reactivity may be effectively increased.

The composition may include an additive. The additive may be a surfactant, a dissolution aid, and/or a dispersing agent, but is not limited thereto.

The composition may include a solvent that may dissolve and/or disperse the above components. The solvent that may dissolve and/or disperse the above components may not be particularly limited as long as it does not cause physical or chemical damage to the substrate. The solvent may be, for example, at least one selected from deionized water, methanol, ethanol, propanol, isopropanol, 2-methoxyethanol, 2-ethoxyethanol, 2-propoxyethanol, 2-butoxyethanol, methylcellosolve, ethylcellosolve, butylcellosolve, diethyleneglycol methyl ether, diethyleneglycol ethyl ether, dipropyleneglycol methyl ether, toluene, xylene, hexane, heptane, octane, ethyl acetate, butyl acetate, diethyleneglycol dimethyl ether, diethyleneglycol dimethyl ethyl ether, methyl ethoxy propionate, ethyl ethoxy propionate, ethyl lactate, propyleneglycol methyl ether acetate, propyleneglycol methyl ether, propyleneglycol propyl ether, methylcellosolve acetate, ethylcellosolve acetate, diethyleneglycol methyl acetate, diethyleneglycol ethyl acetate, acetone, methyl ethyl ketone, methyl isobutyl ketone, cyclopentanone, cyclohexanone, dimethyl formamide (DMF), N,N-dimethyl acetamide (DMAc), N-methyl-2-pyrrolidone, γ-butyrolactone, diethyl ether, ethylene glycol dimethyl ether, diglyme, tetrahydrofuran, acetyl acetone, acetonitrile, chloroform, dichloromethane, tetrachloroethane, trichloroethylene, tetrachloroethylene, chlorobenzene, benzene, toluene, and xylene. The solvent may be a single solvent or a mixture of two or more solvents.

The solvent may be included in a balance (remaining) amount other than the above components based on the total amount of the composition. For example, the composition may include the first liquid crystal compound and the second liquid crystal compound, and the remaining amount may be a solvent.

The composition may be applied on a substrate and may be dried to be prepared as a film.

The substrate may be, for example, a glass substrate, a metal substrate, a semiconductor substrate, or a polymer substrate, and the polymer substrate may be, for example, a substrate made of polyethylene terephthalate (PET), polyvinyl alcohol (PVA), polycarbonate (PC), triacetyl cellulose (TAC), a derivative thereof, and/or a combination thereof.

The composition may be, for example, applied using a solution process such as spin coating, bar coating, slit coating, and/or inkjet coating, and may control a thickness considering a refractive index of the film.

The applied composition may be, for example, dried at a temperature that is greater than or equal to the boiling point of the solvent.

Hereinafter, an optical film formed using the composition is described referring to the drawings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
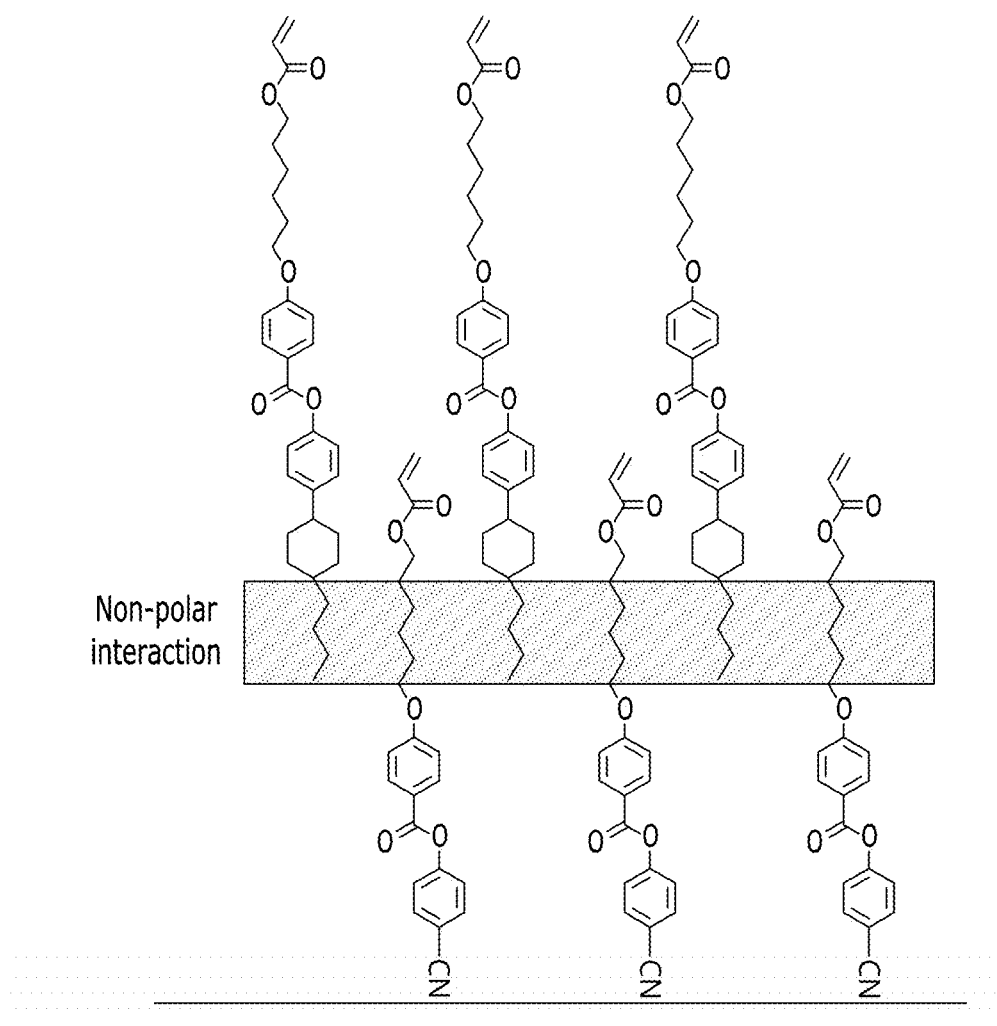

FIGS. 1 and 2 are cross-sectional views showing optical films according to an embodiment.

Referring to FIGS. 1 and 2, an optical film 100 according to an embodiment includes a substrate 110 and a liquid crystal layer 120 positioned on the substrate 110.

The substrate 110 may include, for example, a glass substrate, a metal substrate, a semiconductor substrate, or a polymer substrate. The polymer substrate may be, for example, a substrate made of polyethylene terephthalate (PET), polyvinyl alcohol (PVA), polycarbonate (PC), triacetyl cellulose (TAC), a derivative thereof, and/or a combination thereof, but is not limited thereto. When the optical film 100 includes another lower layer in addition to the substrate, the substrate 110 may be the lowest layer.

The liquid crystal layer 120 may include a liquid crystal mixture including a first liquid crystal compound represented by the following Chemical Formula 1 and a second liquid crystal compound represented by the following Chemical Formula 2.

Chemical Formula 1

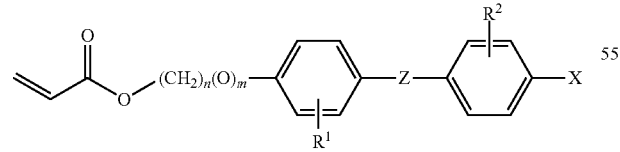

Chemical Formula 2

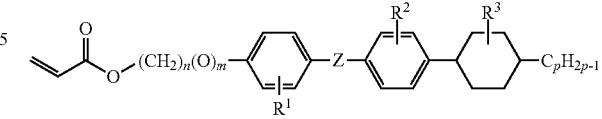

In Chemical Formula 1 or 2,

X is a hydrogen-bonding functional group, $R^1$ to $R^3$ are independently hydrogen, a substituted or unsubstituted C1 to C10 alkyl group, a substituted or unsubstituted C1 to C10 alkoxy group, a halogen atom, a substituted or unsubstituted C1 to C10 halogen-containing group, or a combination thereof, Z is a single bond, —C(=O)O—, —(O=C)O—, or —O(C=O)—, n is 4 to 8, M is 0 or 1, and p is 3 to 6.

The liquid crystal layer 120 may include the first liquid crystal compound and the second liquid crystal compound in a form of a monomer, an oligomer, and/or a polymer.

The first liquid crystal compound may be, for example, represented by the following Chemical Formula 1a, and the second liquid crystal compound may be, for example, represented by the following Chemical Formula 2a.

Chemical Formula 1a

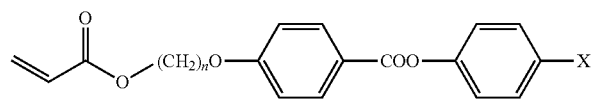

Chemical Formula 2a

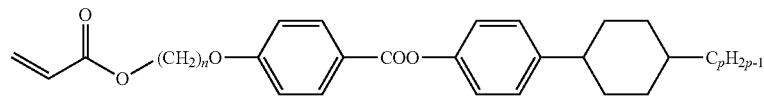

In Chemical Formula 1a or 2a,

X is a cyano group, a substituted or unsubstituted C1 to C10 cyano-containing group, a hydroxy group, substituted or unsubstituted C1 to C10 hydroxy-containing group, a carboxyl group, a substituted or unsubstituted C1-C10 carboxyl-containing group, or a combination thereof, n is 4 to 8, and p is 3 to 6.

The first liquid crystal compound may be, for example, represented by the following Chemical Formula 1aa and the second liquid crystal compound may be, for example, represented by one of the following Chemical Formulae 2aa to 2ad.

Chemical Formula 1aa

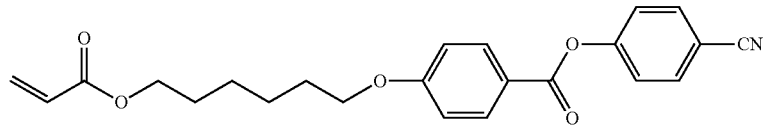

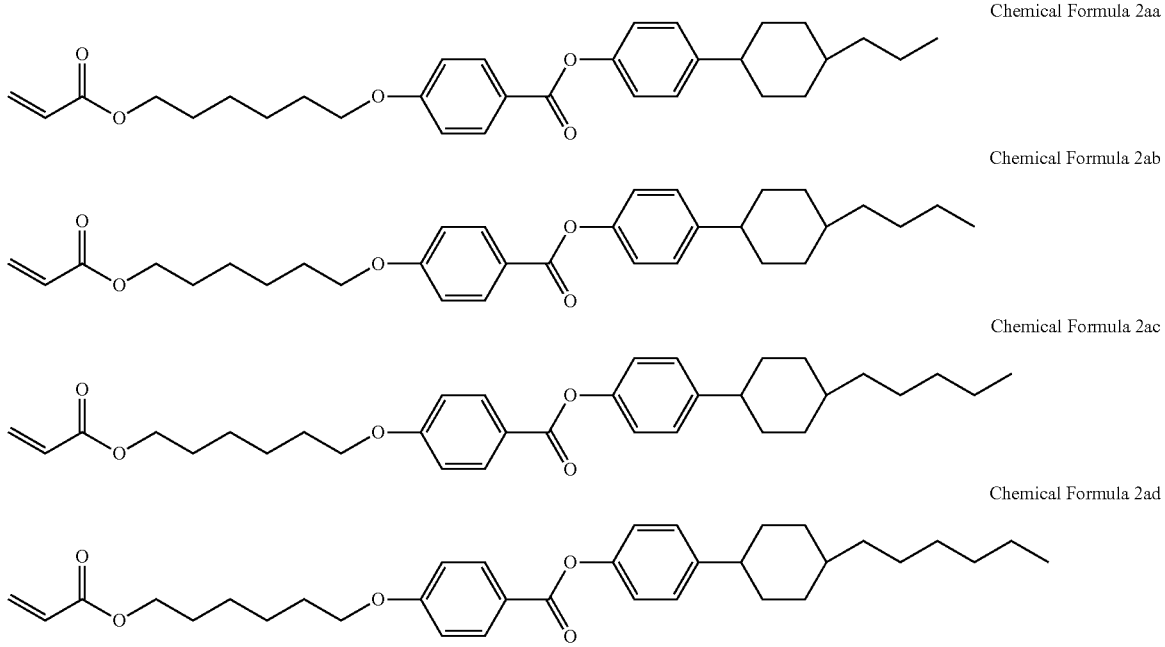

Chemical Formula 2aa

Chemical Formula 2ab

Chemical Formula 2ac

Chemical Formula 2ad

A difference between a solubility parameter of the first liquid crystal compound and a solubility parameter of the second liquid crystal compound is about 2.50 to about 2.90. When the first liquid crystal compound and the second liquid crystal compound have a solubility parameter difference within this range, the first liquid crystal compound and the second liquid crystal compound have high miscibility with each other due to the high degree of interaction between the molecules. Thus, agglomeration of the first liquid crystal compound and the second liquid crystal compound in a solvent may be reduced or prevented, and the first liquid crystal compound and the second liquid crystal compound may be uniformly aligned in a homeotropic direction.

For example, referring to FIG. 2, when the first liquid crystal compound represented by the above Chemical Formula 1aa and the second liquid crystal compound represented by the above Chemical Formula 2aa are used, a cyano group in the first liquid crystal compound has affinity to the substrate 110. Thus, the cyano group may be positioned toward the substrate 110, may be homeotropically aligned to the substrate 110, and non-polar moieties of the first and second liquid crystal compounds may interact with each other and mutually reinforce homeotropic alignment of the first and second liquid crystal compounds. Accordingly, the first and second liquid crystal compounds 110 may maintain miscibility in the liquid crystal layer 120 and may be uniformly aligned in a direction substantially perpendicular to the length direction of the substrate 110.

In this embodiment, the liquid crystal layer 120 may have in-phase retardation ($R_0$) about incident light of 550 nm wavelength (hereinafter referred to as a "reference wavelength") in a range of about 0 nm≤$R_0$≤1 nm, by reinforcing homeotropicity of the liquid crystal layer 120. Herein, the in-phase retardation ($R_0$) may be represented by $R_0=(n_x-n_y)$d, wherein $n_x$ is a refractive index in a direction having a highest in-phase refractive index of the liquid crystal layer 120 (hereinafter referred to as "slow axis"), $n_y$ is a refractive index in a direction having a lowest in-phase refractive index of the liquid crystal layer (hereinafter referred to as a "fast axis"), and d is a thickness of the liquid crystal layer 120. The in-phase retardation ($R_0$) of the liquid crystal layer 120 may be in the range of about 0 nm≤$R_0$≤about 0.5 nm, for example 0 nm≤$R_0$≤0.2 nm.

On the other hand, the retardation may have thickness direction retardation ($R_{th}$) in addition to the in-phase retardation ($R_0$). The thickness direction retardation ($R_{th}$) of the liquid crystal layer 120 is retardation generated in a thickness direction, and may be represented by $R_{th}=\{[(n_x+n_y)/2]-n_z\}d$, wherein $n_x$ is a refractive index of the liquid crystal layer 120 at a slow axis, $n_y$ is a refractive index of the liquid crystal layer 120 at a fast axis, $n_z$ is a refractive index in a direction perpendicular to $n_x$ and $n_y$, and d is a thickness of the liquid crystal layer 120. The thickness direction retardation ($R_{th}$) of the liquid crystal layer 120 may be in the following range: about 50 nm≤$R_{th}$≤500 nm for example about 100 nm≤$R_{th}$≤400 nm.

The liquid crystal layer 120 may have a refractive index satisfying the following Relationship Equation 1.

$$n_z > n_x = n_y \quad \text{Relationship Equation 1}$$

In the Relationship Equation 1, $n_x$ is a refractive index of the liquid crystal layer 120 at a slow axis, $n_y$ is a refractive index of the liquid crystal layer 120 at a fast axis, and $n_z$ is a refractive index in a direction perpendicular to $n_x$ and $n_y$. The optical film 100 may be used alone or may be stacked with another film having a different refractive index.

Hereinafter, a compensation film according to an embodiment is described referring to FIG. 3 along with FIGS. 1 and 2.

Figure 3:
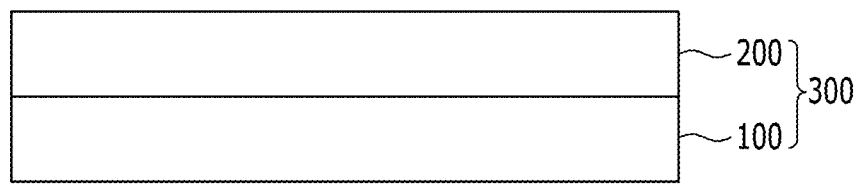
FIG. 3 is a schematic cross-sectional view showing a compensation film according to an embodiment.

FIG. 3 is a schematic cross-sectional view showing a compensation film according to an embodiment.

A compensation film 300 according to an embodiment includes the optical film 100 and a phase retardation film 200.

The optical film 100 includes the substrate 110 and the liquid crystal layer 120, as described above. The liquid crystal layer 120 includes the first liquid crystal compound and the second liquid crystal compound, and thus may achieve homeotropic alignment of the first and second crystal compounds in a direction perpendicular to the length direction on the substrate 110 and in-phase isotropy in which an in-phase retardation ($R_0$) is less than or equal to about 1 nm. The detailed description of the optical film 100 is the same as described above.

The phase retardation film 200 may be a monolayer or a multilayer, and may be a film having a different refractive index from the optical film 100. The phase retardation film 200 may be, for example, a λ/4 phase retardation film, a λ/2 phase retardation film, or a combination thereof, but is not limited thereto. Herein, the λ/4 phase retardation film may be, for example, a film having in-phase retardation of about 120 nm to about 160 nm for incident light of a reference wavelength, and the λ/2 phase retardation film may be, for example, a film having in-phase retardation of about 240 nm to about 320 nm for incident light of a reference wavelength.

The compensation film 300 may further include an adhesion layer (not shown) between the optical film 100 and the phase retardation film 200. The adhesion layer effectively adheres between the optical film 100 and the phase retardation film 200, and may be, for example, made of a pressure sensitive adhesive.

The compensation film 300 may have a different refractive index from those of the optical film 100 and the phase retardation film 200 by combining the refractive indices of the optical film 100 and the phase retardation film 200.

The compensation film 300 may be prepared to have desirable retardation by controlling each refractive index and thickness of the optical film 100 and the phase retardation film 200. For example, the optical film 100 may reduce or offset retardation of the phase retardation film 200 in a thickness direction, and thus decrease dependences on a viewing angle and a wavelength, obtaining a compensation film 300 having a fortified compensation function. This compensation film 300 may effectively realize a circularly polarized light compensation function and thus improve display characteristics of a display device.

The compensation film 300 may be obtained by respectively manufacturing the optical film 100 and the phase retardation film 200 and then assembling them, by coating the optical film 100 on the phase retardation film 200, or by coating the phase retardation film 200 on the optical film 100. The optical film 100 may be manufactured by coating the aforementioned composition on the substrate 110 and cross-linking them as described above. The compensation film 300 may be formed, for example, in a method of roll-to-roll, spin coating, transfer, and the like, but is not limited thereto.

Figure 4:
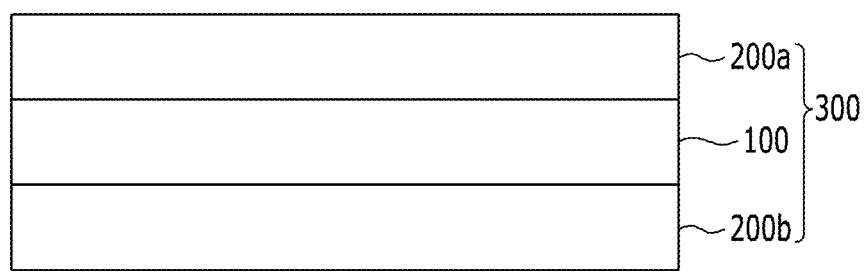
FIG. 4 is a schematic cross-sectional view showing a compensation film according to another embodiment.

FIG. 4 is a schematic cross-sectional view showing a compensation film according to another embodiment.

The compensation film 300 according to the present embodiment includes phase retardation films 200a and 200b positioned on respective sides of the optical film 100, unlike the above embodiment.

The compensation film 300 may have a different refractive index from those of the optical film 100 and the phase retardation films 200a and 200b by combining the refractive indices of the optical film 100 and the phase retardation films 200a and 200b. The compensation film 300 may be prepared to have desirable retardation by controlling each refractive index and thickness of the optical film 100 and the phase retardation films 200a and 200b.

The compensation film 300 may further include an adhesion layer (not shown) either between the optical film 100 and the phase retardation film 200a or between the optical film 100 and the phase retardation film 200b (or both). The adhesion layer effectively adheres between the optical film 100 and the phase retardation films 200a and 200b, and may be, for example, made of a pressure sensitive adhesive.

The compensation film 300 may form an anti-reflective film with a polarizer that may have an external light reflection function.

Figure 5:
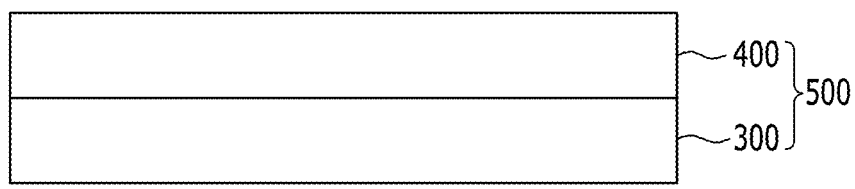
FIG. 5 is a schematic cross-sectional view showing an anti-reflective film according to an embodiment.

FIG. 5 is a schematic cross-sectional view showing an anti-reflective film according to an embodiment.

Referring to FIG. 5, an anti-reflective film 500 according to an embodiment includes a compensation film 300 and a polarizer 400 positioned on the compensation film 300.

The polarizer 400 may be positioned on the optical film 100, and may be positioned on the phase retardation film 200.

The polarizer 400 may be disposed on the side where the light enters, and may be a linear polarizer changing incident unpolarized light into linear polarized light. The polarizer 400 may be made of, for example, elongated polyvinyl alcohol (PVA) prepared according to a method of, for example, stretching a polyvinyl alcohol film, adsorbing iodine or a dichroic dye thereto, and borating and washing the same. The polarizer 400 may be a polarizing film prepared, for example, by mixing a polymer and a dichroic dye and melt-blending the polymer with the dichroic dye at a temperature above the melting point of the polymer.

The anti-reflective film 500 may further include a protective layer (not shown) on the polarizer 400. The protective layer may be provided for further reinforcing the functionality or improving the durability of the anti-reflective film 500, or for reducing reflection or glare. For example, the protective layer may be a triacetyl cellulose (TAC) film, but is not limited thereto.

The anti-reflective film 500 may further include a correction layer (not shown) positioned on the compensation film 300. The correction layer may be, for example, a color shift resistant layer, but is not limited thereto.

The anti-reflective film 500 may further include a light blocking layer (not shown) extending along the edges of the anti-reflective film 500. The light blocking layer may be formed as a strip along the circumference of the anti-reflective film 500. The light blocking layer may include an opaque material, for example, a black material. For example, the light blocking layer may be made of a black ink.

The anti-reflective film 500 may be stacked with the compensation film 300 and the polarizer 400 by a roll-to-roll method, without limitation.

Figure 6:
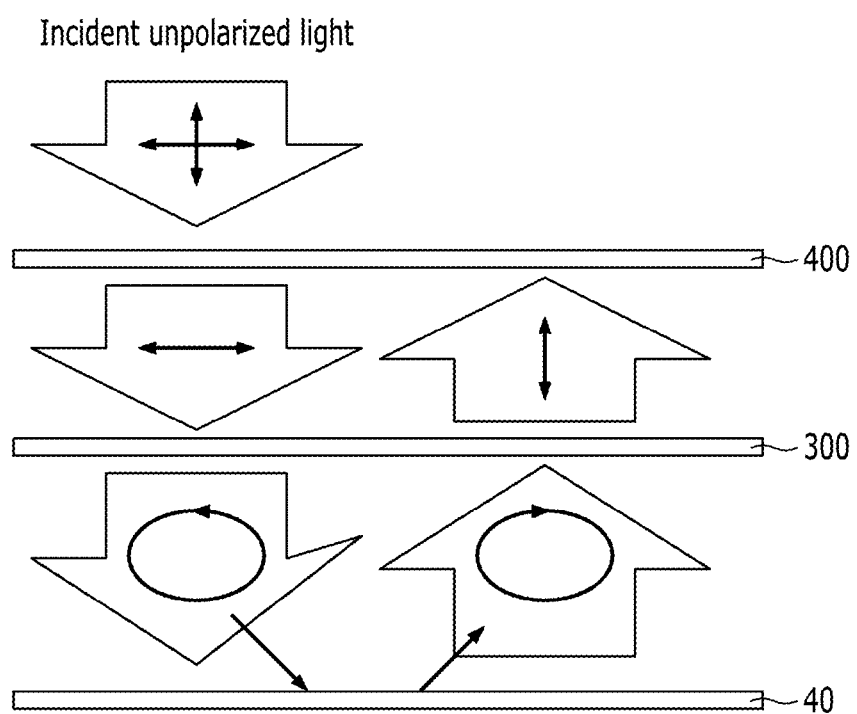
FIG. 6 is a schematic view showing the anti-reflection principle of an anti-reflective film according to an embodiment.

FIG. 6 is a schematic view showing the external light anti-reflection principle of an anti-reflective film according to an embodiment.

Referring to FIG. 6, when the incident unpolarized light enters from the outside (hereinafter referred to as "external light") is passed through the polarizer 400, and the linearly polarized light is changed into circularly polarized light by passing through the compensation film 300, only a first polarized perpendicular component, which is one polarized perpendicular component of two polarized perpendicular components, is transmitted. While the circularly polarized light is reflected in a display panel 40 including a substrate, an electrode, and so on, changes the circular polarization direction, and the circularly polarized light is passed through the compensation film 300 again, only a second polarized perpendicular component, which is the other polarized perpendicular component of the two polarized perpendicular components, may be transmitted. As the second polarized perpendicular component is not passed through the polarizer 400, and light does not exit to the outside, effects of preventing the external light reflection may be provided.

The optical film 100, the compensation film 300, or the anti-reflective film 500 may be applied to various display devices.

A display device according to an embodiment includes a display panel and a film positioned on the display panel. The display panel may be a liquid crystal panel or an organic light emitting panel, but is not limited thereto. The film may be the optical film 100, the compensation film 300, or the anti-reflective film 500.

Hereinafter, an organic light emitting display is described as one example of a display device.

Figure 7:
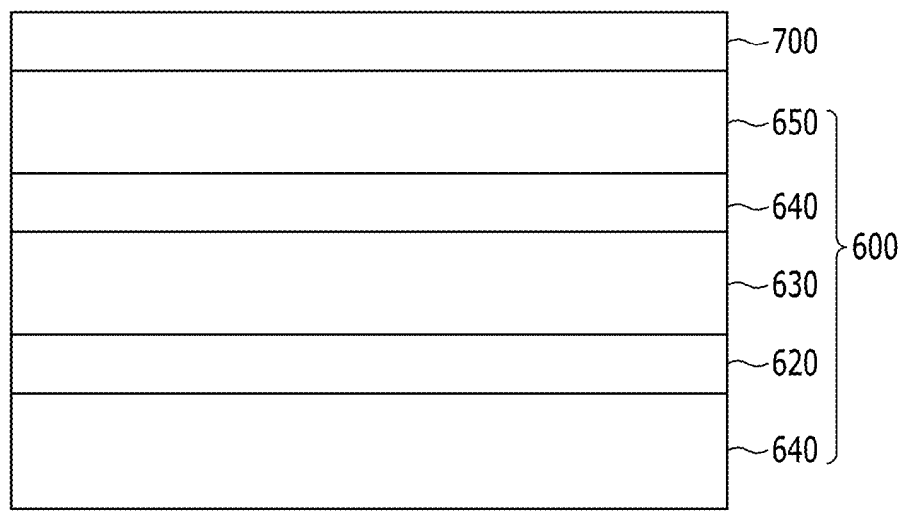
FIG. 7 is a schematic cross-sectional view schematically showing an organic light emitting diode (OLED) display according to an embodiment.

FIG. 7 is a schematic cross-sectional view showing an organic light emitting display according to an embodiment.

Referring to FIG. 7, the organic light emitting display according to an embodiment includes an organic light emitting panel 600 and an optical film 700 positioned on the organic light emitting diode panel 600.

The organic light emitting diode panel 600 may include a base substrate 610, a lower electrode 620, an organic emission layer 630, an upper electrode 640, and an encapsulation substrate 650.

The base substrate 610 may be made of glass or plastic.

One of the lower electrode 620 and the upper electrode 640 may be an anode, and the other one may be a cathode. The anode is an electrode to which holes are injected. and the anode may be made of a conducting material having a high work function. The cathode is an electrode to which electrons are injected. The cathode may be made of a conducting material having a low work function. At least one of the lower electrode 620 and the upper electrode 640 may be made of a transparent conductive material into which external light emits, for example ITO or IZO.

The organic emission layer 630 includes an organic material which may emit light when voltage is applied to the lower electrode 620 and the upper electrode 640.

An auxiliary layer (not shown) may be further provided between the lower electrode 620 and the organic emission layer 630 and/or between the upper electrode 640 and the organic emission layer 630. The auxiliary layer is used to balance electrons and holes, and may include a hole transport layer (HTL), a hole injection layer (HIL), an electron injection layer (EIL), and an electron transporting layer (ETL), but is not limited thereto.

The encapsulation substrate 650 may be made of glass, metal, or a polymer, and may seal the lower electrode 620, the organic emission layer 630, and the upper electrode 640 to prevent moisture and/or oxygen inflow from the outside.

The film 700 may be disposed on the side emitting light. For example, in the embodiment having a bottom emission structure emitting light at the side of the base substrate 610, the film may be disposed on the exterior side of the base substrate 610, while in the embodiment having a top emission structure emitting light at the side of the encapsulation substrate 650, the film may be disposed on the exterior side of the encapsulation substrate encapsulation substrate 650.

The film 700 may be the optical film 100, the compensation film 300, or the anti-reflective film 500. For example, when the film 700 is an anti-reflective film 500, light that inflows through the anti-reflective film 500 may be prevented from being reflected by an reflection layer (which is made of a metal such as an electrode and a wire of the organic light emitting panel 600), and may be prevented from emitting to the external surface of the display device to improve display characteristics of the organic light emitting diode (OLED) display.

Hereinafter, a liquid crystal display (LCD) is described as one example of the display device.

Figure 8:
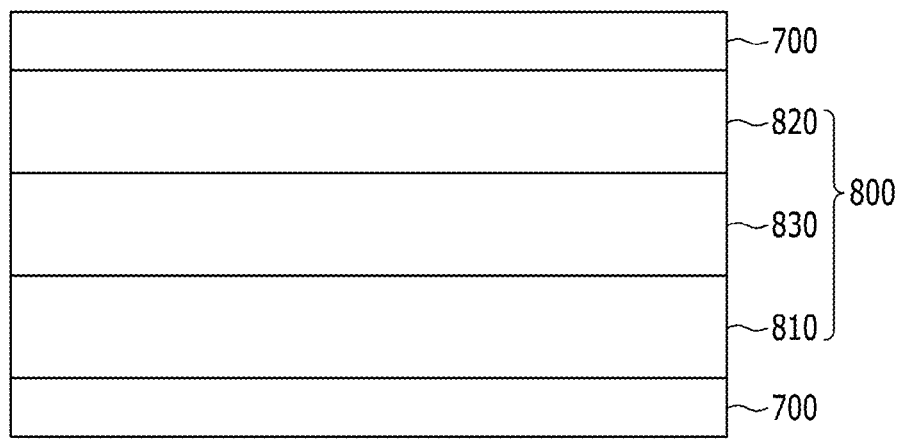
FIG. 8 is a schematic cross-sectional view schematically showing a liquid crystal display (LCD) device according to an embodiment.
Figure 9:
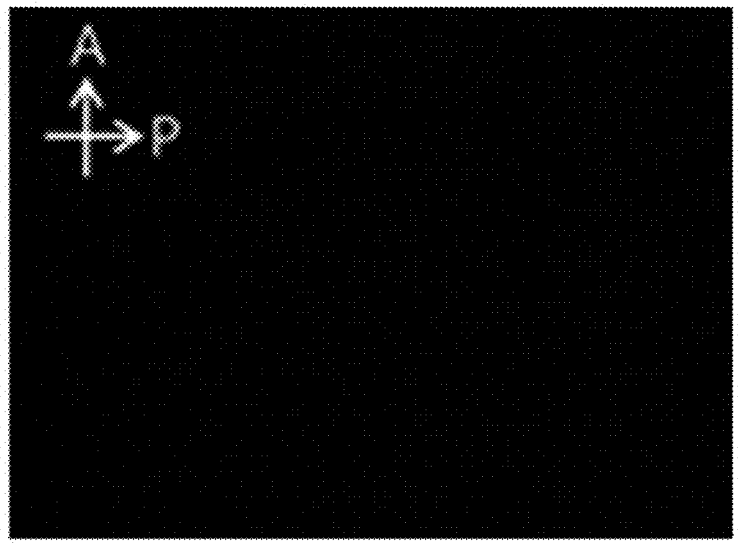
FIGS. 9 to 24 are photographs taken by a polarized optical microscope of films according to Examples 1 to 16, respectively.
Figure 10:
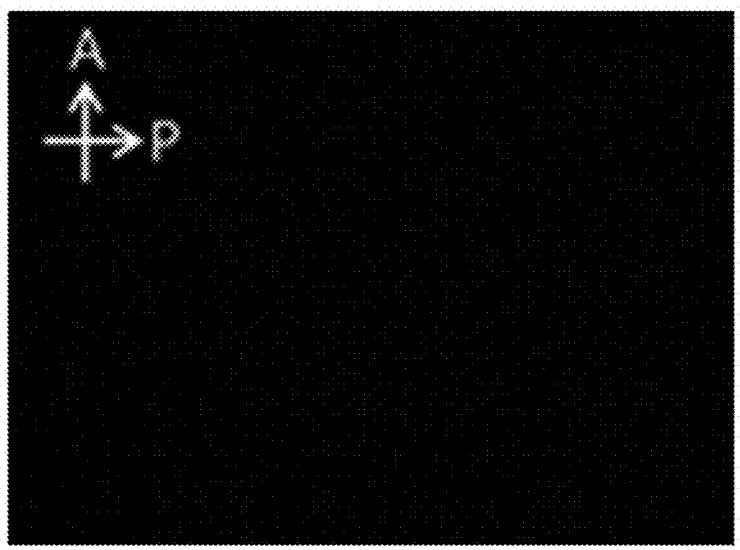
Figure 11:
Figure 12:
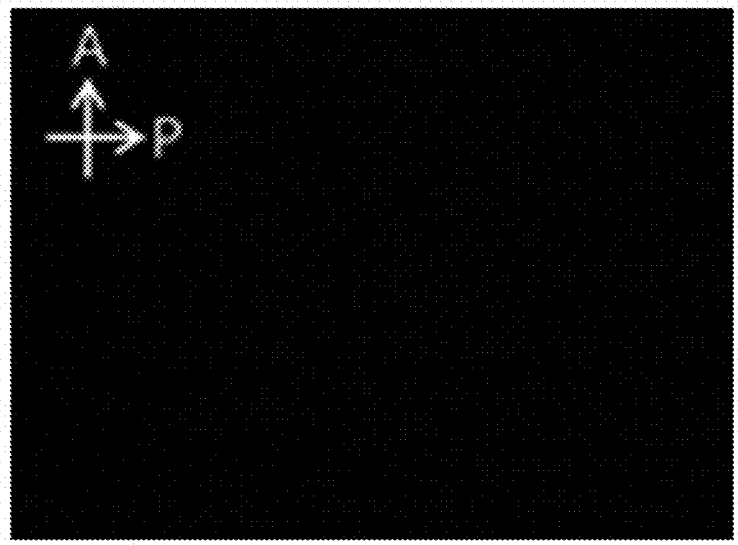
Figure 13:
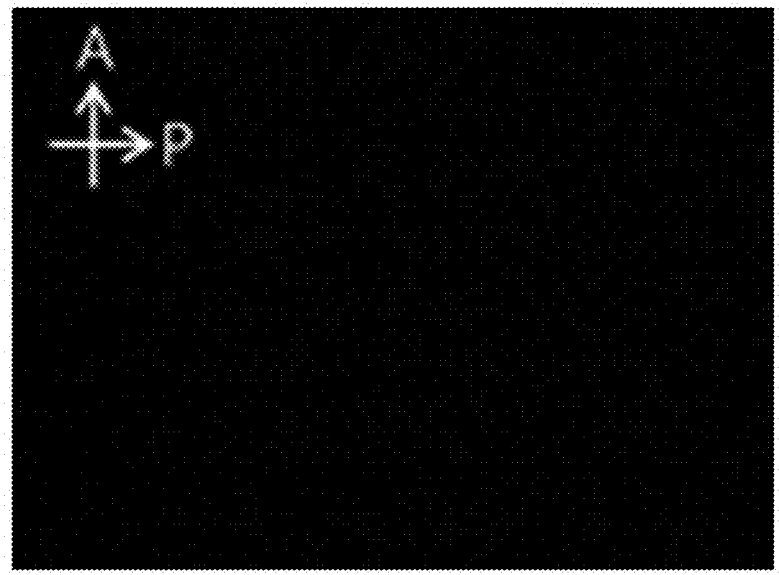
Figure 14:
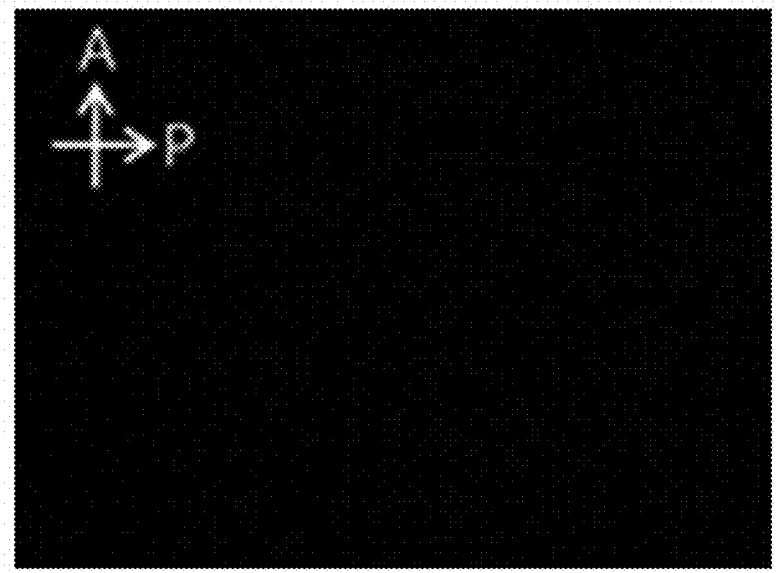
Figure 15:
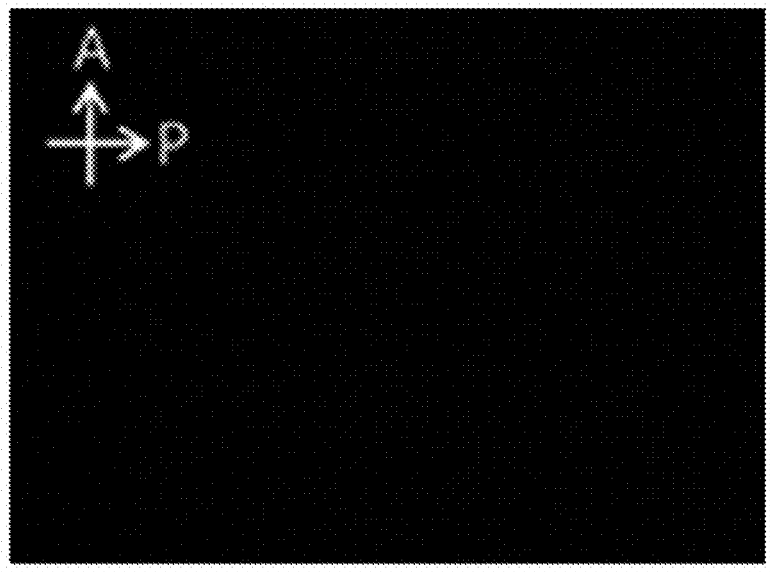
Figure 16:
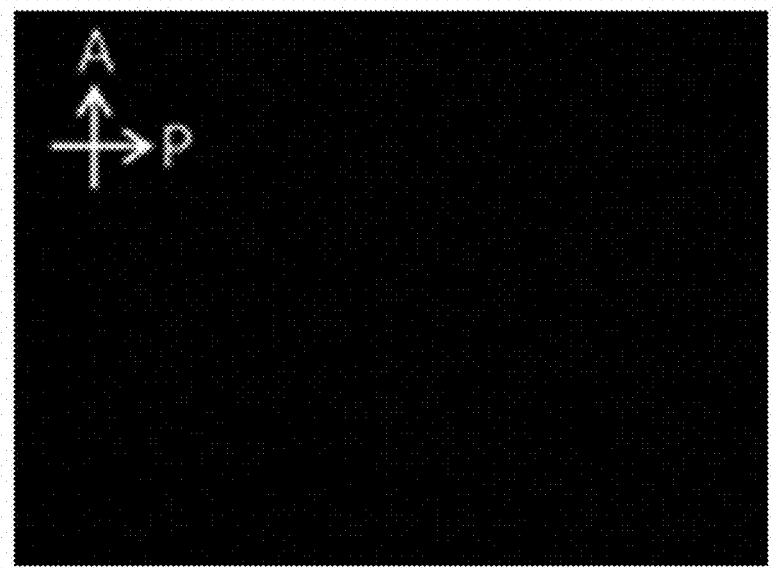
Figure 17:
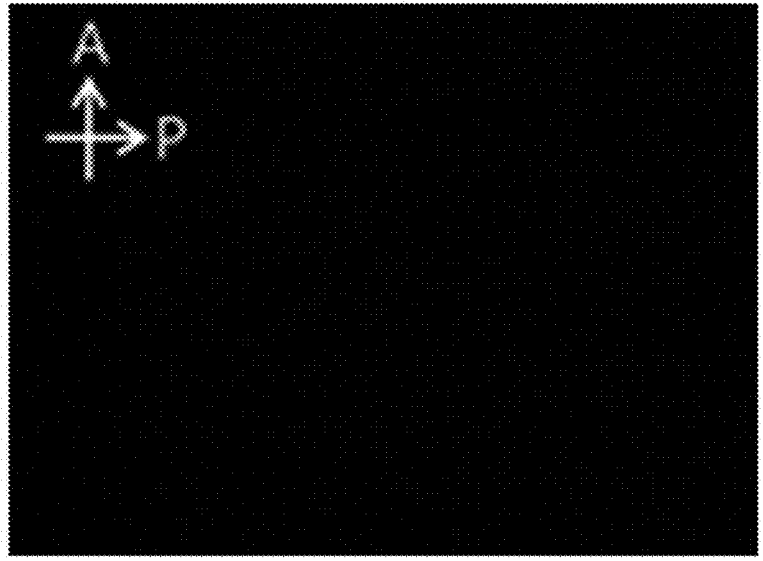
Figure 18:
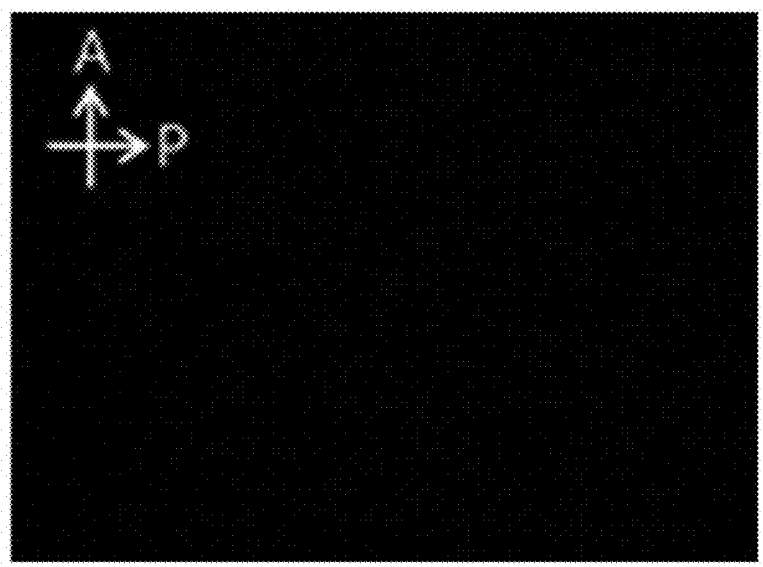
Figure 19:
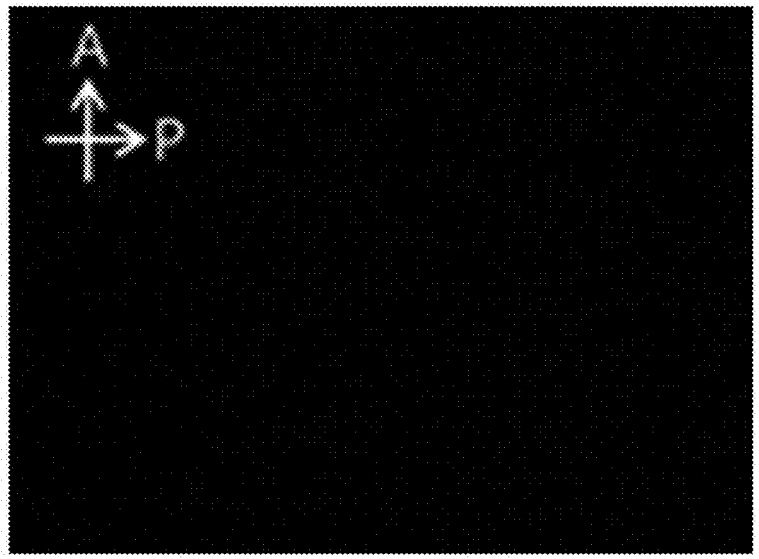
Figure 20:
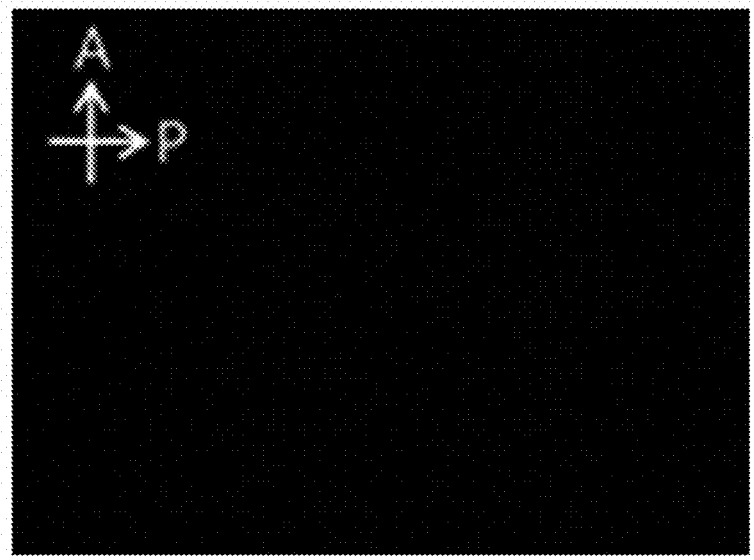
Figure 21:
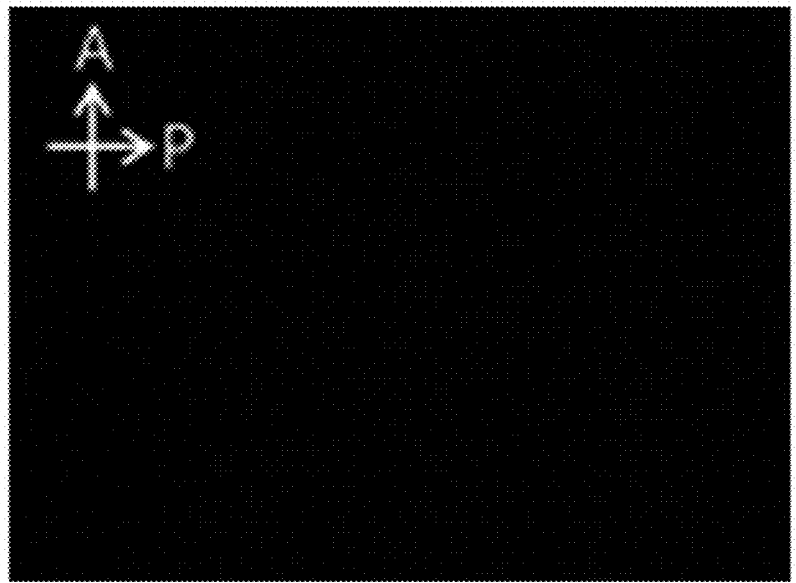
Figure 22:
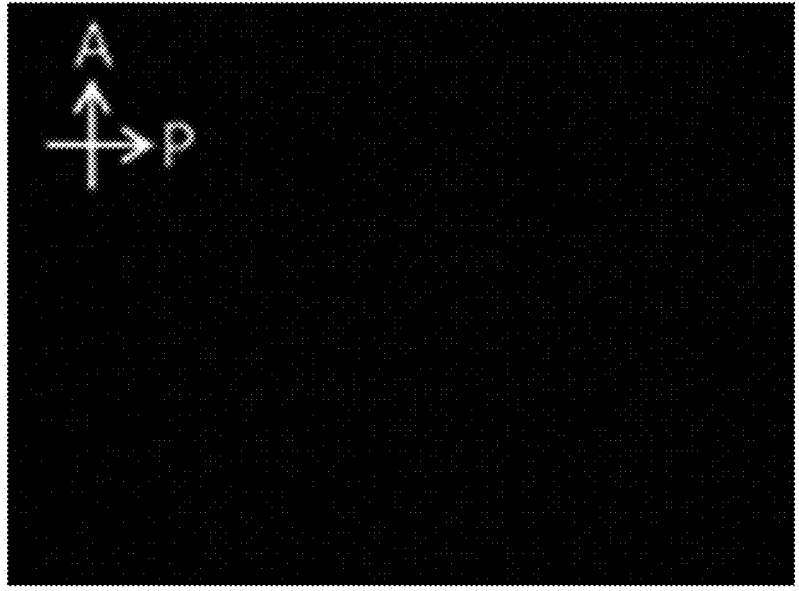
Figure 23:
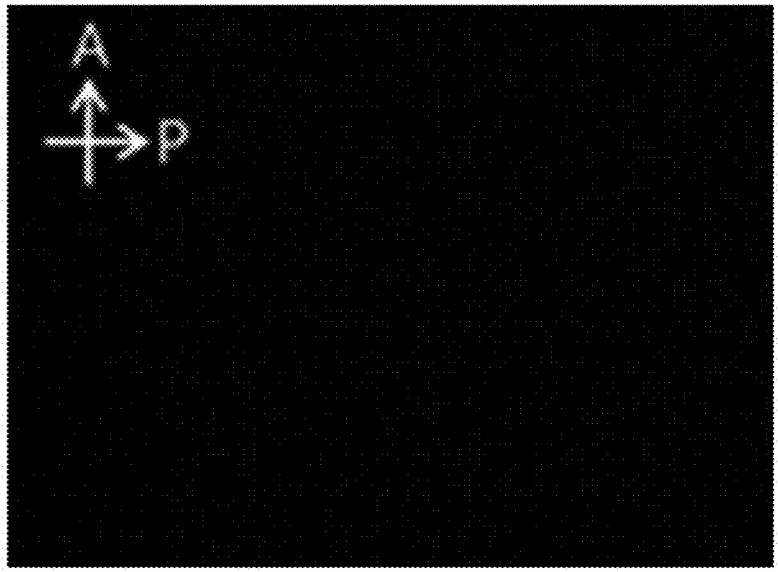
Figure 24:
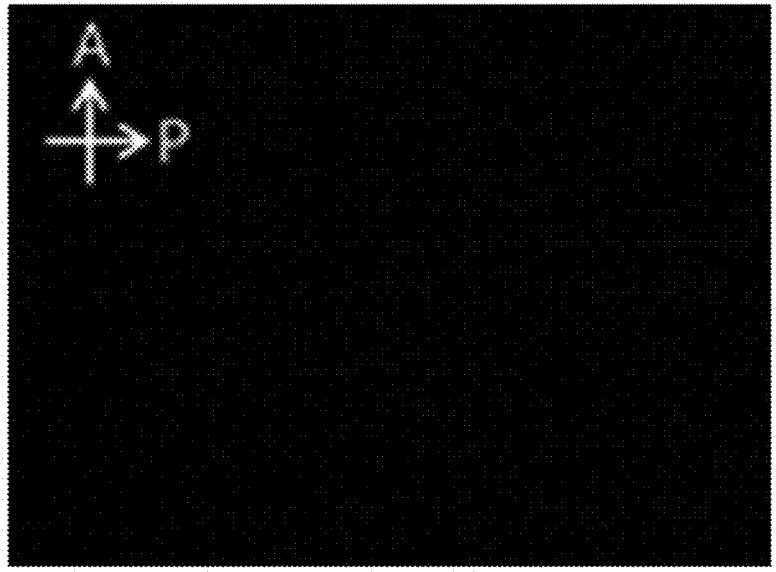
Figure 25:
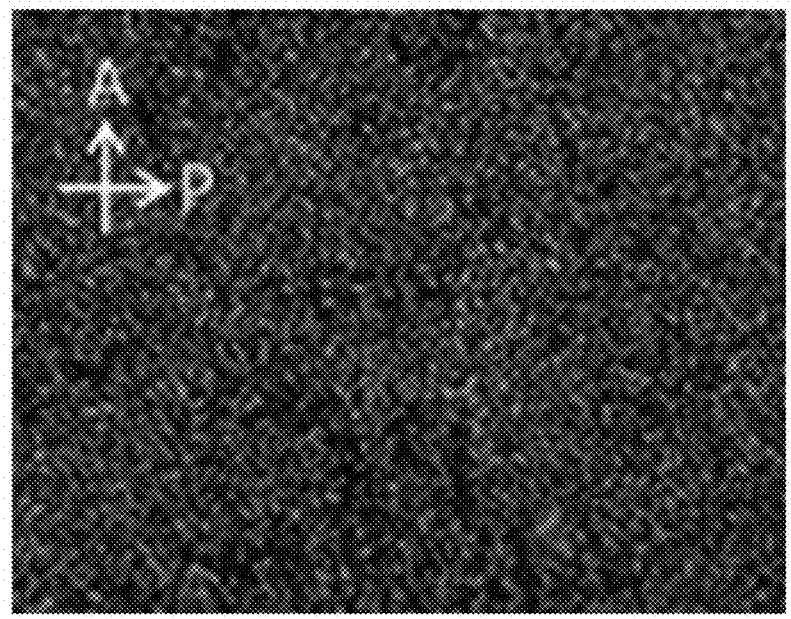
FIGS. 25 to 28 are photographs taken by a polarized optical microscope of films according to Comparative Examples 1 to 4, respectively.
Figure 26:
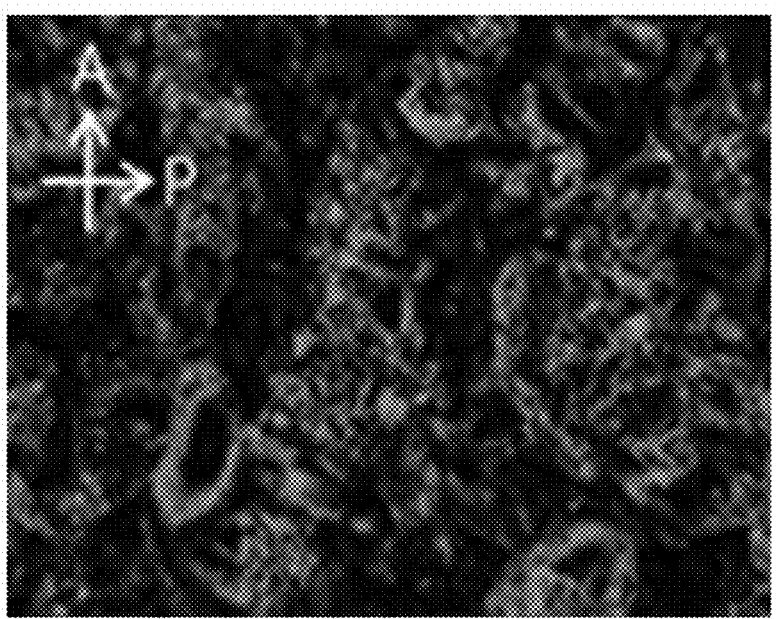
Figure 27:
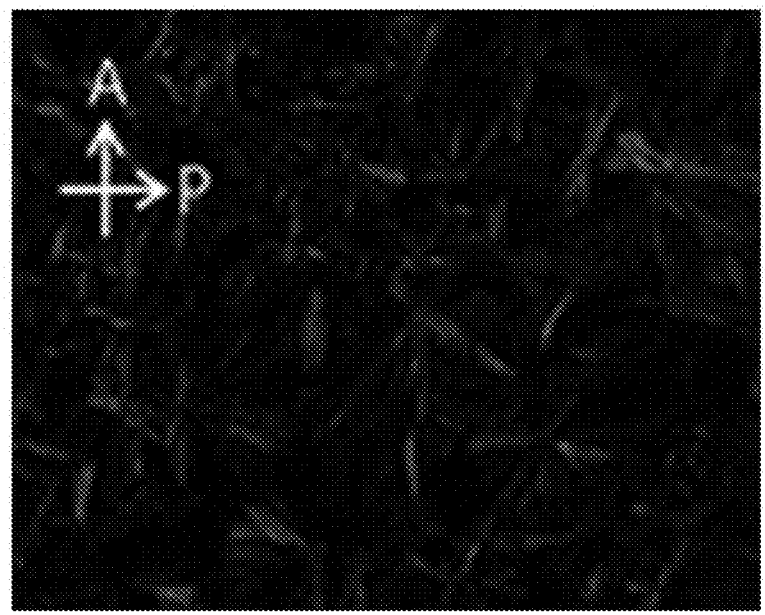
Figure 28:

FIG. 8 is a schematic cross-sectional view showing a liquid crystal display (LCD) device according to an embodiment.

Referring to FIG. 8, the liquid crystal display (LCD) according to an embodiment includes a liquid crystal panel 800, and a film 700 positioned on the liquid crystal panel 800.

The liquid crystal panel 800 may be a twist nematic (TN) mode panel, a patterned vertical alignment (PVA) mode panel, an in-plane switching (IPS) mode panel, an optically compensated bend (OCB) mode panel, or the like.

The liquid crystal panel 800 may include a first display panel 810, a second display panel 820, and a liquid crystal layer 830 interposed between the first display panel 810 and the second display panel 820.

The first display panel 810 may include, for example, a thin film transistor (not shown) formed on a substrate (not shown) and a first electric field generating electrode (not shown) connected to the same, and the second display panel 820 may include, for example, a color filter (not shown) formed on a substrate (not shown) and a second electric field generating electrode (not shown). However, it is not limited thereto, and the color filter may be included in the first display panel 810, while the first electric field generating electrode and the second electric field generating electrode may be disposed on the first display panel 810 together therewith.

The liquid crystal layer 830 may include a plurality of liquid crystal molecules. The liquid crystal molecules may have positive or negative dielectric anisotropy. When the liquid crystal molecules have positive dielectric anisotropy, the major axes thereof may be aligned substantially parallel to the surface of the first display panel 810 and the second display panel 820 when an electric field is not applied. In this case, the major axes may be aligned substantially perpendicular to the surface of the first display panel 810 and second display panel 820 when applying an electric field. On the other hand, when the liquid crystal molecules have negative dielectric anisotropy, the major axes may be aligned substantially perpendicular to the surface of the first display panel 810 and the second display panel 820 when an electric field is not applied. In this case, the major axes may be aligned substantially parallel to the surface of the first display panel 810 and the second display panel 820 when an electric field is applied.

The film 700 may be the optical film 100, the compensation film 300, or the anti-reflective film 500. Films 700 are disposed on the outside of the liquid crystal panel 800. Although these films are shown to be provided on both the lower part and the upper part of the liquid crystal panel 800 in the drawing, they are not limited thereto, and the films may be formed on only one of the lower part and the upper part of the liquid crystal panel 800.

Hereinafter, the present disclosure is illustrated in more detail with reference to examples. However, these examples are exemplary, and the present disclosure is not limited thereto.

SYNTHESIS EXAMPLE

Synthesis Example 1

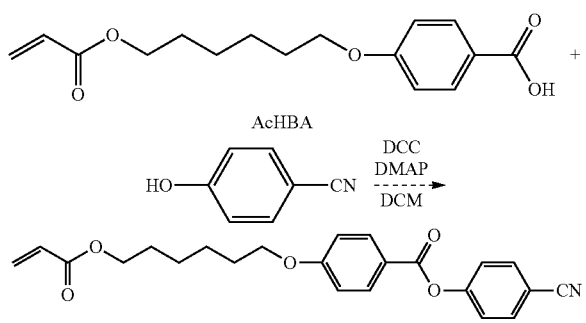

29.2 grams (g) (0.10 moles (mol)) of AcHBA (prepared according to Jpn. Kokai Tokkyo Koho, 2010090221, 22 Apr. 2010) and 13.1 g (0.11 mol) of 4-cyanophenol (Sigma-Aldrich Co., Ltd.) are placed in a 500 milliliters (ml) round-bottomed flask charged with nitrogen and dissolved in 400 ml of dichloromethane (DCM, Samchun Chemical). Subsequently, 1.22 g (0.01 mol) of 4-dimethylaminopyridine (DMAP, Sigma-Aldrich Co. Ltd.) and 20.6 g (0.10 mol) of N,N'-dicyclohexyl carbodiimide (DCC, manufactured by TCI) are added to the solution. The mixture is agitated at room temperature for 10 hours, and a solid produced therein is filtered and removed. The filtered solution is then concentrated under a reduced pressure, and the resultant is recrystallized by using 300 ml of isopropyl alcohol. The obtained product is filtered and dried, obtaining 27.5 g of a compound represented by the following Chemical Formula 1aa (a yield of 70%).

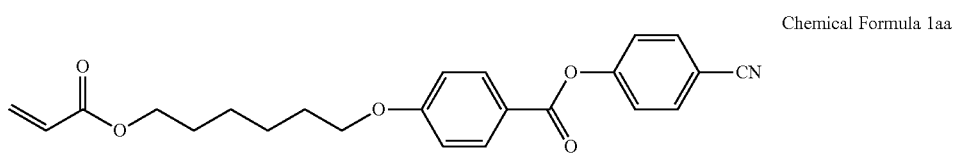 [SMILES: C=CC(=O)OCCCCCCOc1ccc(C(=O)Oc2ccc(C#N)cc2)cc1]

Chemical Formula 1aa

Synthesis Example 2

A compound represented by the following Chemical Formula 2aa is synthesized according to the same method as in Synthesis Example 1, except for using 4-(trans-4-propylcyclohexyl)phenol (manufactured by KANTO Chemical Co., Ltd.), instead of the 4-cyanophenol.

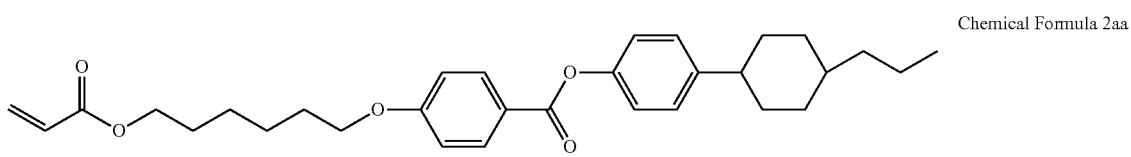 [SMILES: C=CC(=O)OCCCCCCOc1ccc(C(=O)Oc2ccc(C3CCC(CCC)CC3)cc2)cc1]

Chemical Formula 2aa

Synthesis Example 3

A compound represented by the following Chemical Formula 2ab is synthesized according to the same method as in Synthesis Example 1, except for using 4-(trans-4-butylcyclohexyl)phenol (manufactured by KANTO Chemical Co., Ltd.), instead of the 4-cyanophenol.

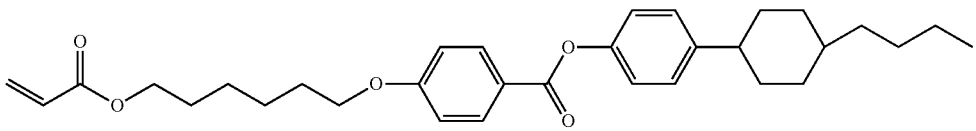

Chemical Formula 2ab

Synthesis Example 4

A compound represented by the following Chemical Formula 2ac is synthesized according to the same method as Synthesis Example 1, except for using 4-(trans-4-pentylcyclohexyl)phenol (manufactured by KANTO Chemical Co., Ltd.), instead of the 4-cyanophenol.

Comparative Synthesis Example 3

A compound represented by the following Chemical Formula C is synthesized according to the same method as in Synthesis Example 1, except for using 4-(trans-4-ethylcyclohexyl)phenol (manufactured by 4Chem), instead of the 4-cyanophenol.

Chemical Formula 2ac

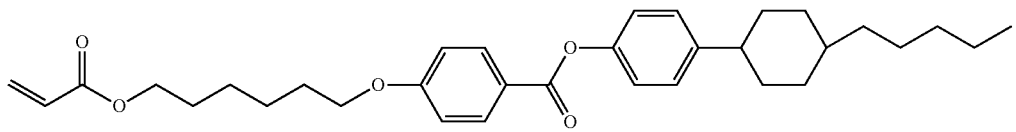

Synthesis Example 5

A compound represented by the following Chemical Formula 2ad is synthesized according to the same method as in Synthesis Example 1, except for using 4-(trans-4-hexylcyclohexyl)phenol (manufactured by KANTO Chemical Co., Ltd.), instead of the 4-cyanophenol.

Chemical Formula 2ad

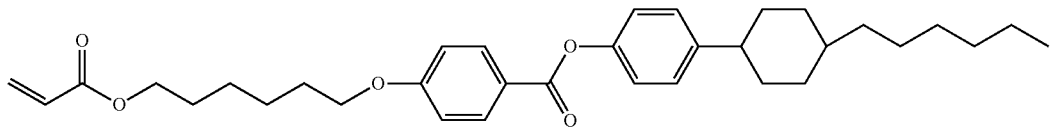

Comparative Synthesis Example 1

A compound represented by the following Chemical Formula A is synthesized according to the same method as in Synthesis Example 1, except for using 4-cyclohexylphenol (manufactured by TCI), instead of the 4-cyanophenol.

Chemical Formula A

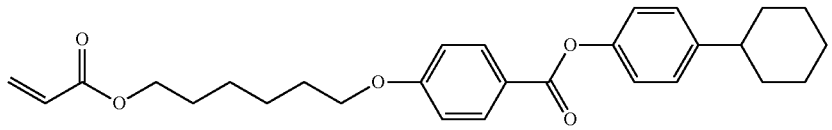

Comparative Synthesis Example 2

A compound represented by the following Chemical Formula B is synthesized according to the same method as in Synthesis Example 1, except for using 4-(trans-4-methylcyclohexyl)phenol (manufactured by 4Chem), instead of the 4-cyanophenol.

Chemical Formula B

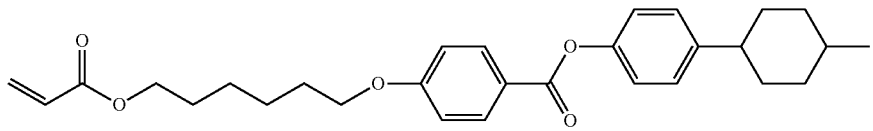

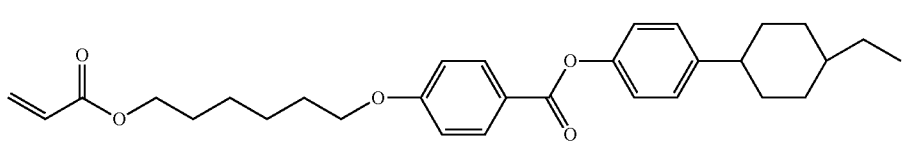

Chemical Formula C

Comparative Synthesis Example 4

A compound represented by the following Chemical Formula D is synthesized according to the same method as in Synthesis Example 1, except for using 4-(trans-4-heptyl-cyclohexyl)phenol (manufactured by 4Chem), instead of the 4-cyanophenol.

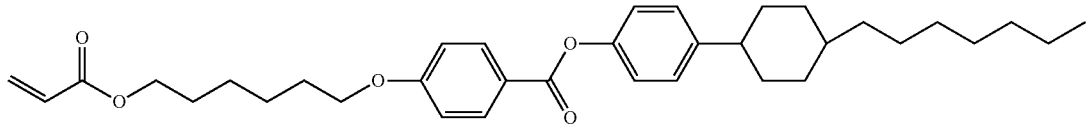

Chemical Formula D

Preparation of Composition

Preparation Example 1

A composition is prepared by mixing 0.67 g of the first liquid crystal compound obtained in Synthesis Example 1, 0.83 g of the second liquid crystal compound prepared according to Synthesis Example 2 (1:1 mole ratio), 0.09 g of Irgacure 907 (manufactured by BASF Co.), and 3.41 g of toluene and agitating the mixture on a 45° C. hot plate for 1 hour.

Preparation Example 2

A composition is prepared by mixing 0.66 g of the first liquid crystal compound prepared according to Synthesis Example 1 and 0.84 g of the second liquid crystal compound prepared according to Synthesis Example 3 (1:1 mole ratio), 0.09 g of Irgacure 907 (manufactured by BASF Co.), and 3.41 g of toluene and then agitating the mixture on a 45° C. hot plate for one hour.

Preparation Example 3

A composition is prepared by mixing 0.65 g of the first liquid crystal compound prepared according to Synthesis Example 1 and 0.85 g of the second liquid crystal compound prepared according to Synthesis Example 4 (1:1 mole ratio), 0.09 g of Irgacure 907 (manufactured by BASF Co.), and 3.41 g of toluene and agitating the mixture on a 45° C. hot plate for 1 hour.

Preparation Example 4

A composition is prepared by mixing 0.64 g of the first liquid crystal compound prepared according to Synthesis Example 1 and 0.86 g of the second liquid crystal compound prepared according to Synthesis Example 5 (1:1 mole ratio), 0.09 g of Irgacure 907 (manufactured by BASF Co.), and 3.41 g of toluene and agitating the mixture on a 45° C. hot plate for 1 hour.

Preparation Example 5

A composition is prepared by mixing 0.79 g of the first liquid crystal compound prepared according to Synthesis Example 1 and 0.71 g of the second liquid crystal compound prepared according to Synthesis Example 2 (1:0.7 of a mole ratio), 0.09 g of Irgacure 907 (manufactured by BASF Co.), and 3.41 g of toluene and agitating the mixture on a 45° C. hot plate for 1 hour.

Preparation Example 6

A composition is prepared by mixing 0.79 g of the first liquid crystal compound prepared according to Synthesis Example 1 and 0.71 g of the second liquid crystal compound prepared according to Synthesis Example 3 (1:0.7 mole ratio), 0.09 g of Irgacure 907 (manufactured by BASF Co.), and 3.41 g of toluene and agitating the mixture on a 45° C. hot plate for 1 hour.

Preparation Example 7

A composition is prepared by mixing 0.78 g of the first liquid crystal compound prepared according to Synthesis Example 1 and 0.72 g of the second liquid crystal compound prepared according to Synthesis Example 4 (1:0.7 mole ratio), 0.09 g of Irgacure 907 (manufactured by BASF Co.), and 3.41 g of toluene and agitating the mixture on a 45° C. hot plate for 1 hour.

Preparation Example 8

A composition is prepared by mixing 0.77 g of the first liquid crystal compound prepared according to Synthesis Example 1 and 0.73 g of the second liquid crystal compound prepared according to Synthesis Example 5 (1:0.7 mole ratio), 0.09 g of Irgacure 907 (manufactured by BASF Co.), and 3.41 g of toluene and agitating the mixture on a 45° C. hot plate for 1 hour.

Preparation Example 9

A composition is prepared by mixing 0.67 g of the first liquid crystal compound prepared according to Synthesis Example 1 and 0.83 g of the second liquid crystal compound prepared according to Synthesis Example 2 (1:1.4 mole ratio), 0.09 g of Irgacure 907 (manufactured by BASF Co.), and 3.41 g of toluene and agitating the mixture on a 45° C. hot plate for 1 hour.

Preparation Example 10

A composition is prepared by mixing 0.66 g of the first liquid crystal compound prepared according to Synthesis Example 1 and 0.84 g of the second liquid crystal compound prepared according to Synthesis Example 3 (1:1.4 mole ratio), 0.09 g of Irgacure 907 (manufactured by BASF Co.), and 3.41 g of toluene and agitating the mixture on a 45° C. hot plate for 1 hour.

Preparation Example 11

A composition is prepared by mixing 0.65 g of the first liquid crystal compound prepared according to Synthesis Example 1 and 0.85 g of the second liquid crystal compound prepared according to Synthesis Example 4 (1:1.4 mole ratio), 0.09 g of Irgacure 907 (manufactured by BASF Co.), and 3.41 g of toluene and agitating the mixture on a 45° C. hot plate for 1 hour.

Preparation Example 12

A composition is prepared by mixing 0.64 g of the first liquid crystal compound prepared according to Synthesis Example 1 and 0.86 g of the second liquid crystal compound prepared according to Synthesis Example 5 (1:1.4 mole ratio), 0.09 g of Irgacure 907 (manufactured by BASF Co.), and 3.41 g of toluene and agitating the mixture on a 45° C. hot plate for 1 hour.

Preparation Example 13

A composition is prepared by mixing 0.43 g of the first liquid crystal compound prepared according to Synthesis Example 1 and 1.07 g of the second liquid crystal compound prepared according to Synthesis Example 2 (1:2 mole ratio), 0.09 g of Irgacure 907 (manufactured by BASF Co.), and 3.41 g of toluene and agitating the mixture on a 45° C. hot plate for 1 hour.

Preparation Example 14

A composition is prepared by mixing 0.42 g of the first liquid crystal compound prepared according to Synthesis Example 1 and 1.08 g of the second liquid crystal compound prepared according to Synthesis Example 3 (1:2 mole ratio), 0.09 g of Irgacure 907 (manufactured by BASF Co.), and 3.41 g of toluene and agitating the mixture on a 45° C. hot plate for 1 hour.

Preparation Example 15

A composition is prepared by mixing 0.41 g of the first liquid crystal compound prepared according to Synthesis Example 1 and 1.09 g of the second liquid crystal compound prepared according to Synthesis Example 4 (1:2 mole ratio), 0.09 g of Irgacure 907 (manufactured by BASF Co.), and 3.41 g of toluene and agitating the mixture on a 45° C. hot plate for 1 hour.

Preparation Example 16

A composition is prepared by mixing 0.40 g of the first liquid crystal compound prepared according to Synthesis Example 1 and 1.10 g of the second liquid crystal compound prepared according to Synthesis Example 5 (1:2 mole ratio), 0.09 g of Irgacure 907 (manufactured by BASF Co.), and 3.41 g of toluene and agitating the mixture on a 45° C. hot plate for 1 hour.

Comparative Preparation Example 1

A composition is prepared by mixing 0.70 g of the first liquid crystal compound prepared according to Synthesis Example 1 and 0.80 g of the second liquid crystal compound prepared according to Comparative Synthesis Example 1 (1:1 mole ratio), 0.09 g of Irgacure 907 (manufactured by BASF Co.), and 3.41 g of toluene and agitating the mixture on a 45° C. hot plate for 1 hour.

Comparative Preparation Example 2

A composition is prepared by mixing 0.69 g of the first liquid crystal compound prepared according to Synthesis Example 1 and 0.81 g of the second liquid crystal compound prepared according to Comparative Synthesis Example 2 (1:1 mole ratio), 0.09 g of Irgacure 907 (manufactured by BASF Co.), and 3.41 g of toluene and agitating the mixture on a 45° C. hot plate for 1 hour.

Comparative Preparation Example 3

A composition is prepared by mixing 0.68 g of the first liquid crystal compound prepared according to Synthesis Example 1 and 0.82 g of the second liquid crystal compound prepared according to Comparative Synthesis Example 3 (1:1 mole ratio), 0.09 g of Irgacure 907 (manufactured by BASF Co.), and 3.41 g of toluene and agitating the mixture on a 45° C. hot plate for 1 hour.

Comparative Preparation Example 4

A composition is prepared by mixing 0.63 g of the first liquid crystal compound prepared according to Synthesis Example 1 and 0.87 g of the second liquid crystal compound prepared according to Comparative Synthesis Example 4 (1:1 mole ratio), 0.09 g of Irgacure 907 (manufactured by BASF Co.), and 3.41 g of toluene and agitating the mixture on a 45° C. hot plate for 1 hour.

Calculation of Solubility Parameter

Solubility parameters of the liquid crystal compounds are calculated using a Hildebrand solubility parameter.

Molecules are cohered due to composite bonding action of van der Waals force, dipole moment, and the like, and energy for the cohesion is defined as cohesive energy ($E_{coh}$). This cohesion energy is expressed as internal cohesive energy ($E_{coh}$) change per mole according to the following Relationship Equation 1.

$$E_{coh} = \Delta U = \Delta H - \Delta T \quad \text{Relationship Equation 1}$$

In the Relationship Equation 1, $E_{coh}$ indicates cohesion energy, $\Delta U$ indicates the amount of internal energy change per mol, $\Delta H$ indicates the amount of enthalpy change, and $\Delta T$ indicates the amount of temperature change.

In addition, cohesive energy per unit volume may be defined by cohesive energy density (CED), and the cohesive energy density may be expressed by the following Relationship Equation 2.

$$CED = (\Delta H - RT)/V_m \quad \text{Relationship Equation 2}$$

In the Relationship Equation 2,

CED indicates cohesive energy density,

ΔH indicates enthalpy change amount,

R is a constant,

T is a temperature, and $V_m$ is a mole volume.

The cohesive energy density is used to define a Hildebrand solubility parameter which expresses dissolving capability, and the solubility parameter is calculated by using a density or a mole volume at a particular temperature according to the following Relationship Equation 3.

$$\delta = (CED)^{0.5} = (\Sigma E_{coh}^i / \Sigma V_m^i)^{0.5} \quad \text{Relationship Equation 3}$$

In the Relationship Equation 3,

δ is a solubility parameter,

CED is cohesive energy density, $E_{coh}^i$ is cohesive energy of a functional group i in a molecule, and $V_m^i$ is a mole volume.

The Hildebrand solubility parameter values used to design the liquid crystal compound may be calculated through group contribution of a molecule.

Group contribution of cohesive energy ($E_{coh}$) and mole volume ($V_m$) used to calculate the solubility parameter of the dichroic dyes are provided in Table 1. (Reference Article: Polym. Eng. Sci. 1974, 14, 147; J. Appl. Polym. Sci. 2005, 96, 416.)

TABLE 1

| Group | $E_{coh}$ (J/mol) | $V_m$ (cm³/mol) |
|---|---|---|
| —CH$_3$ | 4707 | 33.5 |
| —CH$_2$— | 4937 | 16.1 |
| —CH— | 3431 | −1.0 |
| C | 1464 | −19.2 |
| H$_2$C= | 4310 | 28.5 |
| —CH= | 4310 | 13.5 |
| C= | 4310 | −5.5 |
| Phenyl | 31924 | 71.4 |
| Phenylene (o, m, p) | 31924 | 52.4 |
| Phenyl (trisubstituted) | 31924 | 33.4 |
| Phenyl (tetrasubstituted) | 31924 | 14.4 |
| Phenyl (pentasubstituted) | 31924 | −4.6 |
| Phenyl (hexasubstituted) | 31924 | −23.6 |
| Ring closure 5 or more atoms | 1046 | 16.0 |
| Ring closure 3 or 4 atoms | 3138 | 18.0 |
| —COOH | 27614 | 28.5 |
| —CO$_2$— | 17991 | 18.0 |
| —CO— | 17364 | 10.8 |
| —CONH— | 33472 | 9.5 |
| —NH$_2$ | 12552 | 19.2 |
| —NH— | 8368 | 4.5 |
| N | 4184 | −9.0 |
| —N= | 11715 | 5.0 |
| —N=N— | 4188 | 0.0 |
| —CN | 25522 | 24.0 |
| NO$_2$ | 15355 | 32.0 |
| —O— | 3347 | 3.8 |
| —OH | 29790 | 10.0 |
| S | 14142 | 12.0 |
| —F | 4184 | 18.0 |
| —Cl | 11548 | 24.0 |
| —Br | 15481 | 30.0 |
| —I | 19037 | 31.5 |

Calculated solubility parameters of the liquid crystal compounds according to Preparation Examples 1 to 16 and Comparative Preparation Examples 1 to 4 are shown in Table 2.

TABLE 2

| | | Liquid crystal compound | Solubility parameter (δ) | Solubility parameter difference from first liquid crystal compound (Δδ) |
|---|---|---|---|---|
| First liquid crystal compound | Preparation Example 1-16, Comparative Preparation Example 1-3 (common) | Chemical Formula 1aa | 23.31 | — |
| Second liquid crystal compound | Preparation Examples 1, 5, 9, 13 | Chemical Formula 2aa | 20.73 | 2.58 |
| | Preparation Examples 2, 6, 10, 14 | Chemical Formula 2ab | 20.62 | 2.69 |
| | Preparation Examples 3, 7, 11, 15 | Chemical Formula 2ac | 20.52 | 2.79 |
| | Preparation Examples 4, 8, 12, 16 | Chemical Formula 2ad | 20.43 | 2.88 |
| | Comparative Preparation Example 1 | Chemical Formula A | 21.22 | 2.09 |
| | Comparative Preparation Example 2 | Chemical Formula B | 20.97 | 2.34 |
| | Comparative Preparation Example 3 | Chemical Formula C | 20.85 | 2.46 |
| | Comparative Preparation Example 4 | Chemical Formula D | 20.34 | 2.97 |

Manufacture of Film

Example 1

The composition of Preparation Example 1 is spin-coated on a 1 millimeter (mm)-thick glass substrate at 1,000 revolutions per minute (rpm) for 30 seconds. The coated substrate is allowed to stand in an 80° C. oven for 2 minutes and at room temperature for 2 minutes, and then dried and cooled, forming a liquid crystal layer. Subsequently, the liquid crystal layer is cured to form a film on the substrate by radiating ultraviolet (UV) rays at 1,000 milliJoules per square centimeter (mJ/cm²).

Example 2

A film is manufactured according to the same method as in Example 1, except for using the composition of Preparation Example 2 instead of the composition of Preparation Example 1.

Example 3

A film is manufactured according to the same method as in Example 1, except for using the composition of Preparation Example 3 instead of the composition of Preparation Example 1.

Example 4

A film is manufactured according to the same method as in Example 1, except for using the composition of Preparation Example 4 instead of the composition of Preparation Example 1.

Example 5

A film is manufactured according to the same method as in Example 1, except for using the composition of Preparation Example 5 instead of the composition of Preparation Example 1.

Example 6

A film is manufactured according to the same method as in Example 1, except for using the composition of Preparation Example 6 instead of the composition of Preparation Example 1.

Example 7

A film is manufactured according to the same method as in Example 1, except for using the composition of Preparation Example 7 instead of the composition of Preparation Example 1.

Example 8

A film is manufactured according to the same method as in Example 1, except for using the composition of Preparation Example 8 instead of the composition of Preparation Example 1.

Example 9

A film is manufactured according to the same method as in Example 1, except for using the composition of Preparation Example 9 instead of the composition of Preparation Example 1.

Example 10

A film is manufactured according to the same method as in Example 1, except for using the composition of Preparation Example 10 instead of the composition of Preparation Example 1.

Example 11

A film is manufactured according to the same method as in Example 1, except for using the composition of Preparation Example 11 instead of the composition of Preparation Example 1.

Example 12

A film is manufactured according to the same method as in Example 1, except for using the composition of Preparation Example 12 instead of the composition of Preparation Example 1.

Example 13

A film is manufactured according to the same method as in Example 1, except for using the composition of Preparation Example 13 instead of the composition of Preparation Example 1.

Example 14

A film is manufactured according to the same method as in Example 1, except for using the composition of Preparation Example 14 instead of the composition of Preparation Example 1.

Example 15

A film is manufactured according to the same method as in Example 1, except for using the composition of Preparation Example 15 instead of the composition of Preparation Example 1.

Example 16

A film is manufactured according to the same method as in Example 1, except for using the composition of Preparation Example 16 instead of the composition of Preparation Example 1.

Comparative Example 1

A film is manufactured according to the same method as in Example 1, except for using the composition of Comparative Preparation Example 1 instead of the composition of Preparation Example 1.

Comparative Example 2

A film is manufactured according to the same method as in Example 1, except for using the composition of Comparative Preparation Example 2 instead of the composition of Preparation Example 1.

Comparative Example 3

A film is manufactured according to the same method as in Example 1, except for using the composition of Comparative Preparation Example 3 instead of the composition of Preparation Example 1.

Comparative Example 4

A film is manufactured according to the same method as in Example 1, except for using the composition of Comparative Preparation Example 4 instead of the composition of Preparation Example 1.

Evaluation

Evaluation 1

Retardation of the films according to Examples 1 to 16 and Comparative Examples 1 to 4 is measured.

The retardation is measured by using AxoScan™ (Axometrics).

The results are shown in Table 3.

TABLE 3

|  | Solubility parameter difference ($\Delta\delta$) | In-phase retardation ($R_0$, @550 nm) | Thickness direction retardation ($R_{th}$, @550 nm) |
| --- | --- | --- | --- |
| Example 1 | 2.58 | 0.12 nm | −313.47 nm |
| Example 2 | 2.69 | 0.13 nm | −307.25 nm |
| Example 3 | 2.79 | 0.12 nm | −304.06 nm |
| Example 4 | 2.88 | 0.14 nm | −315.32 nm |
| Example 5 | 2.58 | 0.32 nm | −320.19 nm |
| Example 6 | 2.69 | 0.21 nm | −316.33 nm |

TABLE 3-continued

| | Solubility parameter difference ($\Delta\delta$) | In-phase retardation ($R_0$, @550 nm) | Thickness direction retardation ($R_{th}$, @550 nm) |
|---|---|---|---|
| Example 7 | 2.79 | 0.15 nm | −307.18 nm |
| Example 8 | 2.88 | 0.23 nm | −319.46 nm |
| Example 9 | 2.58 | 0.19 nm | −312.34 nm |
| Example 10 | 2.69 | 0.15 nm | −320.11 nm |
| Example 11 | 2.79 | 0.20 nm | −304.35 nm |
| Example 12 | 2.88 | 0.40 nm | −310.25 nm |
| Example 13 | 2.58 | 0.19 nm | −319.56 nm |
| Example 14 | 2.69 | 0.12 nm | −301.26 nm |
| Example 15 | 2.79 | 0.19 nm | −305.89 nm |
| Example 16 | 2.88 | 0.17 nm | −312.65 nm |
| Comparative Example 1 | 2.09 | 23.62 nm | −12.30 nm |
| Comparative Example 2 | 2.34 | 21.11 nm | −30.71 nm |
| Comparative Example 3 | 2.46 | 7.51 nm | −131.21 nm |
| Comparative Example 4 | 2.97 | 10.54 nm | −98.17 nm |

Referring to Table 3, the films according to Examples 1 to 16 have very low in-phase retardation of less than or equal to about 1 nm.

Evaluation 2

The alignment states of the liquid crystal layers according to Examples 1 to 16 and Comparative Examples 1 to 4 are examined by using a polarized optical microscope.

The films of Examples 1 to 16 and Comparative Examples 1 to 4 are disposed on sample holders after the polarizer and analyzer of the polarized optical microscope (EclipseLV100POL, NIKON) are perpendicularly positioned to have an angle of 90°. Then, it was examined whether the films have black color or not. Perfect black color means that a liquid crystal layer has satisfactory homeotropic alignment. A lower degree of black color means that the liquid crystal layer has insufficient homeotropic alignment and leaks light.

The results are shown in Table 4 and FIGS. 9 to 28.

FIGS. 9 to 24 are photographs taken by a polarized optical microscope of films prepared according to Examples 1 to 16, respectively, and FIGS. 25 to 28 are photographs taken by a polarized optical microscope of films prepared according to Comparative Examples 1 to 4, respectively.

TABLE 4

| | Alignment |
|---|---|
| Example 1 | ⊚ |
| Example 2 | ⊚ |
| Example 3 | ⊚ |
| Example 4 | ⊚ |
| Example 5 | ⊚ |
| Example 6 | ⊚ |
| Example 7 | ⊚ |
| Example 8 | ⊚ |
| Example 9 | ⊚ |
| Example 10 | ⊚ |
| Example 11 | ⊚ |
| Example 12 | ⊚ |
| Example 13 | ⊚ |
| Example 14 | ⊚ |
| Example 15 | ⊚ |
| Example 16 | ⊚ |
| Comparative Example 1 | X |
| Comparative Example 2 | X |
| Comparative Example 3 | Δ |

TABLE 4-continued

| | Alignment |
|---|---|
| Comparative Example 4 | X | wherein in Table 4
⊚: perfect black/
Δ: a small amount of light leakage/
X: a large amount of light leakage Referring to Table 4 and FIGS. 9 to 24, the films prepared according to Examples 1 to 16 show perfect black color. Accordingly, the films according to Examples 1 to 16 show satisfactory homeotropicity of liquid crystals in a liquid crystal layer.

On the contrary, referring to Table 4 and FIGS. 25 to 28, the films prepared according to Comparative Examples 1 to 4 do not show perfect black color but have light leakage. Accordingly, the films prepared according to Comparative Examples 1 to 4 show imperfect homeotropicity of liquid crystals in a liquid crystal layer.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition for an optical film, comprising:
a first liquid crystal compound represented by Chemical Formula 1 and a second liquid crystal compound represented by Chemical Formula 2,
wherein a difference between a solubility parameter of the first liquid crystal compound and a solubility parameter of the second liquid crystal compound is about 2.50 to about 2.90:

[Chemical Formula 1]

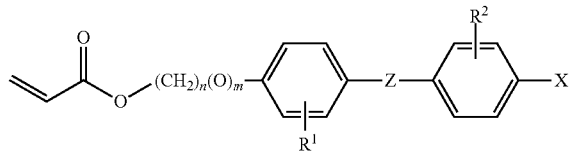

[Chemical Formula 2]

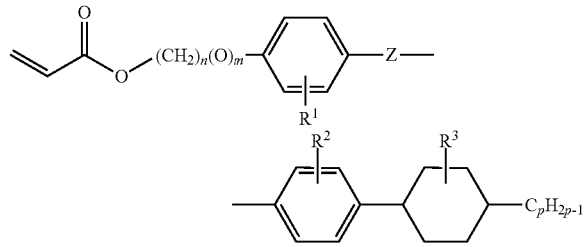

wherein, in Chemical Formula 1 or 2,
X is a hydrogen-bonding functional group,
$R^1$ to $R^3$ are independently hydrogen, a substituted or unsubstituted C1 to C10 alkyl group, a substituted or unsubstituted C1 to C10 alkoxy group, a halogen atom, a substituted or unsubstituted C1 to C10 halogen-containing group, or a combination thereof,
Z is a single bond, —C(=O)O—, —(O=C)O—, or —O(C=)O—,
n is 4 to 8,
m is 0 or 1, and
p is 3 to 6.

2. The composition for an optical film of claim 1, wherein the X of Chemical Formula 1 is a cyano group, a substituted or unsubstituted C1 to C10 cyano-containing group, a hydroxy group, substituted or unsubstituted C1 to C10 hydroxy-containing group, a carboxyl group, a substituted or unsubstituted C1 to C10 carboxyl-containing group, or a combination thereof.

3. The composition for an optical film of claim 1, wherein the first liquid crystal compound is represented by Chemical Formula 1a and the second liquid crystal compound is represented by Chemical Formula 2a:

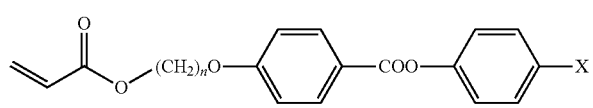

Chemical Formula 1a

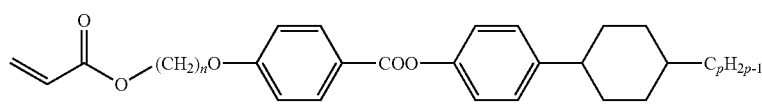

Chemical Formula 2a wherein, in Chemical Formula 1a or 2a,

X is a cyano group, a substituted or unsubstituted C1 to C10 cyano-containing group, a hydroxy group, substituted or unsubstituted C1 to C10 hydroxy-containing group, a carboxyl group, a substituted or unsubstituted C1-C10 carboxyl-containing group, or a combination thereof, n is 4 to 8, and p is 3 to 6.

4. The composition for an optical film of claim 3, wherein the first liquid crystal compound is represented by Chemical Formula 1aa and the second liquid crystal compound is represented by one of Chemical Formulae 2aa to 2ad:

Chemical Formula 1aa

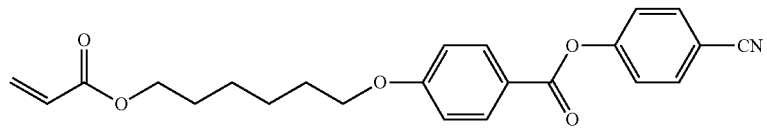

Chemical Formula 2aa

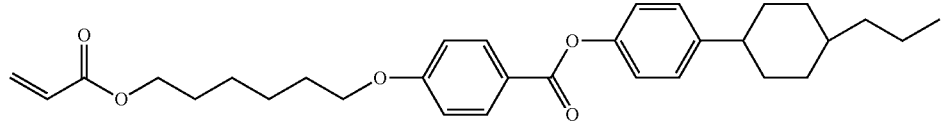

Chemical Formula 2ab

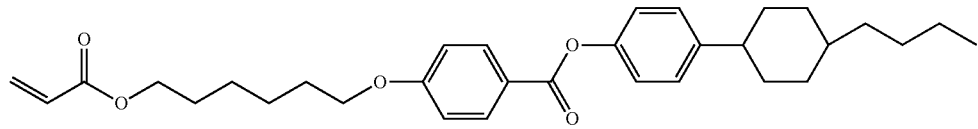

Chemical Formula 2ac

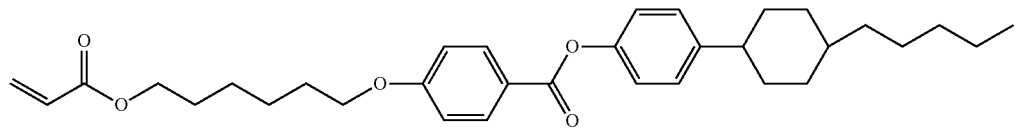

Chemical Formula 2ad

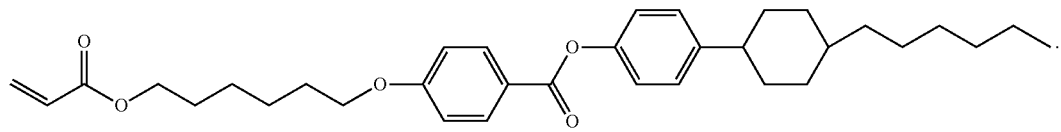

5. The composition for an optical film of claim 1, further comprising a solvent,
wherein an amount of the first liquid crystal compound and the second liquid crystal compound in the composition is about 5 to about 50 percent by weight based on the total weight of the composition, and the remaining amount is the solvent.

6. The composition for an optical film of claim 5, wherein a mole ratio of the first liquid crystal compound and the second liquid crystal compound is about 1:0.7 to about 1:2.

7. The composition for an optical film of claim 1, further comprising a photoinitiator.

8. The composition for an optical film of claim 7, wherein an amount of the photoinitiator is about 0.1 to about 2 percent by weight based on the total amount of the composition.

9. An optical film comprising
a substrate, and
a liquid crystal layer positioned on the substrate,
wherein the liquid crystal layer comprises a first liquid crystal compound represented by Chemical Formula 1 and a second liquid crystal compound represented by Chemical Formula 2, and
wherein a difference between a solubility parameter of the first liquid crystal compound and a solubility parameter of the second liquid crystal compound is about 2.50 to about 2.90:

unsubstituted C1 to C10 alkoxy group, a halogen atom, a substituted or unsubstituted C1 to C10 halogen-containing group, or a combination thereof, Z is a single bond, —C(=O)O—, —(O=C)O— or —O(C=O)—, n is 4 to 8, M is 0 or 1, and p is 3 to 6.

10. The optical film of claim 9, wherein the X of Chemical Formula 1 comprises a cyano group, a substituted or unsubstituted C1 to C10 cyano-containing group, a hydroxy group, a substituted or unsubstituted C1 to C10 hydroxy-containing group, a carboxyl group, a substituted or unsubstituted C1 to C10 carboxyl-containing group, or a combination thereof.

11. The optical film of claim 9, wherein the first liquid crystal compound is represented by Chemical Formula 1a and the second liquid crystal compound is represented by Chemical Formula 2a:

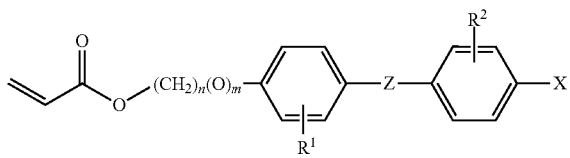

Chemical Formula 1

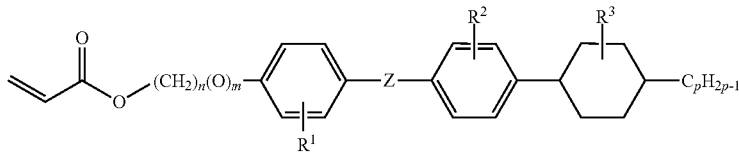

Chemical Formula 2 wherein, in Chemical Formula 1 or 2,

X is a hydrogen-bonding functional group, $R^1$ to $R^3$ are independently hydrogen, a substituted or unsubstituted C1 to C10 alkyl group, a substituted or

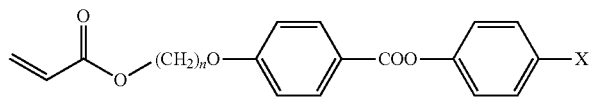

Chemical Formula 1a

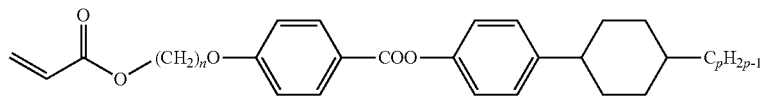

Chemical Formula 2a wherein, in Chemical Formula 1a or 2a,

X is a cyano group, a substituted or unsubstituted C1 to C10 cyano-containing group, a hydroxy group, a substituted or unsubstituted C1 to C10 hydroxy-containing group, a carboxyl group, a substituted or unsubstituted C1-C10 carboxyl-containing group, or a combination thereof, n is 4 to 8, and p is 3 to 6.

12. The optical film of claim 11, wherein the first liquid crystal compound is represented by Chemical Formula 1aa and the second liquid crystal compound is represented by one of Chemical Formulae 2aa to 2ad:

16. The optical film of claim 9, wherein the liquid crystal has a refractive index satisfying Relationship Equation 1:

$$n_z > n_x = n_y$$ 
Relationship Equation 1 wherein, in Relationship Equation 1, $n_x$ is a refractive index of the liquid crystal at a slow axis, $n_y$ is a refractive index of the liquid crystal at a fast axis, and $n_z$ is a refractive index in a direction perpendicular to $n_x$ and $n_y$.

17. A compensation film comprising:
the optical film of claim 9, and
a retardation film positioned on at least one side of the optical film.

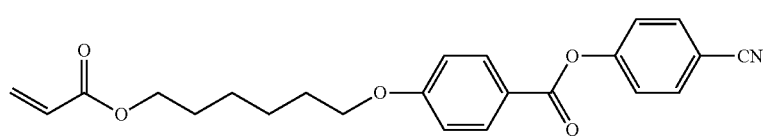
Chemical Formula 1aa

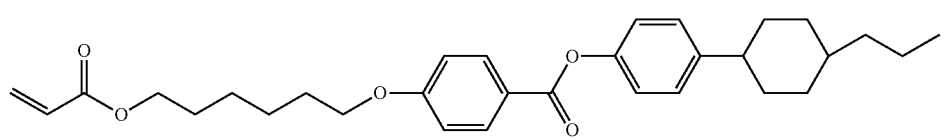
Chemical Formula 2aa

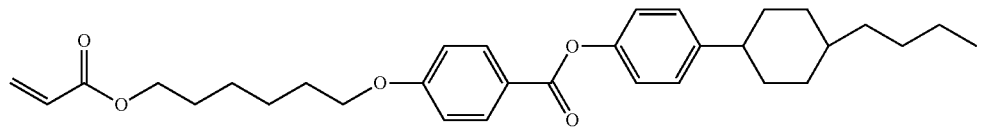
Chemical Formula 2ab

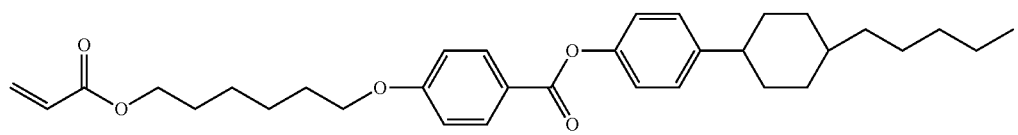
Chemical Formula 2ac

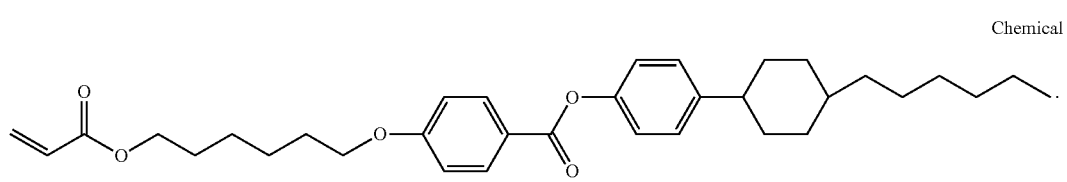
Chemical Formula 2ad

13. The optical film of claim 9, wherein the first liquid crystal compound and the second liquid crystal compound are aligned in a direction perpendicular to the length direction of the substrate.

14. The optical film of claim 9, wherein the liquid crystal layer has in-plane retardation $R_0$ of 0 nanometers$\leq R_0 \leq 1$ nanometer for incident light of about 550 nanometers wavelength.

15. The optical film of claim 14, wherein the liquid crystal layer has thickness direction retardation $R_{th}$ of 50 nanometers$\leq R_{th} \leq 500$ nanometers for incident light of about 550 nanometers wavelength.

18. The compensation film of claim 17, wherein the retardation film comprises a λ/4 retardation film, a λ/2 retardation film, or a combination thereof.

19. An anti-reflective film, comprising:
the compensation film of claim 17, and
a polarizer positioned on the compensation film.

20. A display device comprising a display panel and the optical film of claim 9.

21. A display device comprising a display panel and the compensation film of claim 17.

22. A display device comprising a display panel and the anti-reflective film of claim 19.

* * * * *